United States Patent
Pitchford et al.

(10) Patent No.: US 9,057,453 B2
(45) Date of Patent: Jun. 16, 2015

(54) WIRELESS FLUID SHUT-OFF VALVE

(71) Applicant: Gas Sentinel LLC, Fairfax, VA (US)

(72) Inventors: Barth R. Pitchford, Fairfax, VA (US);
John H. Pitchford, Fairfax, VA (US);
William D. Pitchford, Fairfax, VA (US);
Donald S. Pitchford, Fairfax, VA (US);
Steven Nagel, Maryland Heights, MO (US); Benedict J. Nardi, Thurmont, MD (US); Russell S. Smith, Boyds, MD (US); Robert Simon, Fairfax, VA (US)

(73) Assignee: GAS SENTINEL, LLC, Fairfax, VA (US)

( * ) Notice: Subject to any disclaimer, the term of this patent is extended or adjusted under 35 U.S.C. 154(b) by 0 days.

(21) Appl. No.: 14/143,915

(22) Filed: Dec. 30, 2013

(65) Prior Publication Data

US 2014/0110613 A1    Apr. 24, 2014

Related U.S. Application Data

(63) Continuation-in-part of application No. 14/064,290, filed on Oct. 28, 2013, now Pat. No. 8,807,523, which is a continuation of application No. 12/950,474, filed on Nov. 19, 2010, now Pat. No. 8,567,757.

(60) Provisional application No. 61/263,355, filed on Nov. 21, 2009.

(51) Int. Cl.
*F16K 31/02*    (2006.01)
*F16K 31/08*    (2006.01)

(52) U.S. Cl.
CPC ............ *F16K 31/088* (2013.01); *F16K 31/086* (2013.01); *F16K 31/082* (2013.01); *F16K 31/084* (2013.01)

(58) Field of Classification Search
USPC ......... 251/129.04, 129.01, 65, 68, 70, 71, 74, 251/248; 137/38, 39, 78.4; 340/5.61, 5.64, 340/5.8, 13.24
See application file for complete search history.

(56) References Cited

U.S. PATENT DOCUMENTS

| | | | | |
|---|---|---|---|---|
| 2,927,592 A | * | 3/1960 | Ferre, Sr. | 137/38 |
| 3,747,616 A | * | 7/1973 | Lloyd | 137/38 |
| 4,018,419 A | * | 4/1977 | Monpetit | 251/65 |
| 4,207,912 A | * | 6/1980 | Ichikawa | 137/39 |
| 4,212,313 A | * | 7/1980 | Winters | 137/39 |

(Continued)

*Primary Examiner* — John K Fristoe, Jr.
*Assistant Examiner* — Minh Le
(74) *Attorney, Agent, or Firm* — The Marbury Law Group, PLLC

(57) ABSTRACT

A low-cost safety valve for gas lines and similar supply lines that can be remotely activated via a secure wireless link employing a low leakage sealing mechanism that is compatible with low energy actuators to for extended battery life. A miniaturized controller and wireless electronics assembly provides the control mechanism for actuating the valve, as well as reporting data regarding the valve status to wireless interrogators or external networks via an ad hoc wireless network. A variety of simple magnetic valve operating mechanisms can be implemented with the miniaturized electronic control circuits and the valve body. Such control actuation mechanisms enable automatic resetting or manual resetting valves. The gas line shut off valve can provide important safety benefits at an affordable price. An RFID transceiver may be included to enable low-power operation and communications using RFID technologies as well as an automatic antenna tuning capability to maximize radio range.

14 Claims, 19 Drawing Sheets

(56) References Cited

U.S. PATENT DOCUMENTS

| | | | | |
|---|---|---|---|---|
| 4,382,449 | A * | 5/1983 | Nelson | 137/38 |
| 5,052,429 | A * | 10/1991 | Yoo | 137/38 |
| 5,409,031 | A * | 4/1995 | McGill et al. | 137/38 |
| 5,603,345 | A * | 2/1997 | Franklin et al. | 137/15.03 |
| 5,823,223 | A * | 10/1998 | Franklin et al. | 137/38 |
| 5,853,019 | A * | 12/1998 | Hollenbach | 137/38 |
| 6,085,772 | A * | 7/2000 | McGill et al. | 137/39 |
| 6,109,287 | A * | 8/2000 | Cole et al. | 137/38 |
| RE38,220 | E * | 8/2003 | Engdahl | 137/38 |
| 6,938,637 | B2 * | 9/2005 | McGill et al. | 137/39 |
| 7,126,464 | B2 * | 10/2006 | Harvey | 340/471 |
| 7,559,529 | B2 * | 7/2009 | Affaticati et al. | 251/129.04 |
| 7,616,095 | B2 * | 11/2009 | Jones et al. | 340/10.5 |
| 7,650,901 | B2 * | 1/2010 | Engdahl | 137/39 |
| 7,694,936 | B2 * | 4/2010 | Hoffmann et al. | 251/129.04 |
| 8,020,586 | B2 * | 9/2011 | Delamarche | 137/831 |
| 2005/0127315 | A1 * | 6/2005 | Hollingsworth et al. | 251/129.04 |
| 2007/0205861 | A1 * | 9/2007 | Nair et al. | 340/5.61 |
| 2007/0290882 | A1 * | 12/2007 | Consorte et al. | 340/825.72 |
| 2008/0060701 | A1 * | 3/2008 | Kim | 137/38 |
| 2008/0150749 | A1 * | 6/2008 | Lin | 340/825.72 |
| 2008/0224077 | A1 * | 9/2008 | Neuhaus | 251/129.01 |
| 2009/0256090 | A1 * | 10/2009 | Affaticati et al. | 251/129.04 |

\* cited by examiner

WIRELESS FLUID SHUT-OFF VALVE

RELATED APPLICATIONS

This application is a continuation-in-part of U.S. patent application Ser. No. 14/064,290 filed Oct. 28, 2013, which is a continuation of U.S. patent application Ser. No. 12/950,474 entitled "Wireless Fluid Shut-Off Valve," now U.S. Pat. No. 8,567,757, which claims the benefit of priority to U.S. Provisional Application No. 61/263,355, entitled "Low Cost Wireless Gas Meter and Shut-Off Valve Using Wireless Sensor Network Technology With A Magnetic Monitoring and Resetting Mechanism" filed Nov. 21, 2009, the entire contents of all of which are hereby incorporated by reference.

BACKGROUND

Residential and industrial use of natural gas and other flammable gasses provide many economic and quality of life benefits, but at a cost in terms of safety and infrastructure. Due to the flammable and explosive nature of natural gas, shutoff valves are needed in order to limit the supply of gas to a structure in the event of fire, structural damage (e.g., from earthquakes), and gas leaks, as well as when a structure is no longer occupied. Manually operated valves are currently used for isolating gas supplies to structures. However, such battles require gas utility workers to enter the structure in order to close the valve when needed. In the event of a fire emergency or significant structural damage, such manual actuation of the valves can represent a significant risk to workers. Further, fire and rescue personnel may be held up in the air response to emergency by the need to wait for someone from the gas utility to arrive on scene to close the gas isolation valves.

SUMMARY

The various embodiments provide remotely actuatable fluid isolation valves and methods for remotely shutting fluid isolation valves utilizing wireless communication networks. The embodiments provide a low-cost shutoff valve for a gas, water, and other fluid supply lines that can be remotely activated via a wireless communication network which may be multi-point or point-to-point, self forming and adaptive. A simple closure valve provides low leakage sealing using a mechanism that is compatible with low energy actuators to enable long life battery-operated control circuits. The valve can be configured to be tamper proof and failsafe. Miniaturized controller and wireless network electronics provides a control mechanism for actuating the valve, as well as reporting data regarding the valve status to external networks via a wireless ad hoc communication network. A variety of simple magnetic valve operating mechanisms can be implemented with the miniaturized electronic control circuits and the valve body. Such control actuation mechanisms enable self resetting or manual resetting valves. When implemented on gas lines, the embodiment shutoff valves can provide important safety benefits at an affordable price. The programmable control processors and wireless transceivers of the various embodiments enable useful capabilities including, for example, collection and communication of data from a variety of sensors, automatic actuation (i.e., closure) in response to sensor data (e.g., elevated temperature), aggregate behavior (e.g., automatic actuation by a group of valves in response to collective analysis of sensor data from multiple valves), and relative location estimation based upon relative signal strength of wireless signals, with these capabilities programmable and updatable "over the air" via the ad hoc wireless communication networks.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
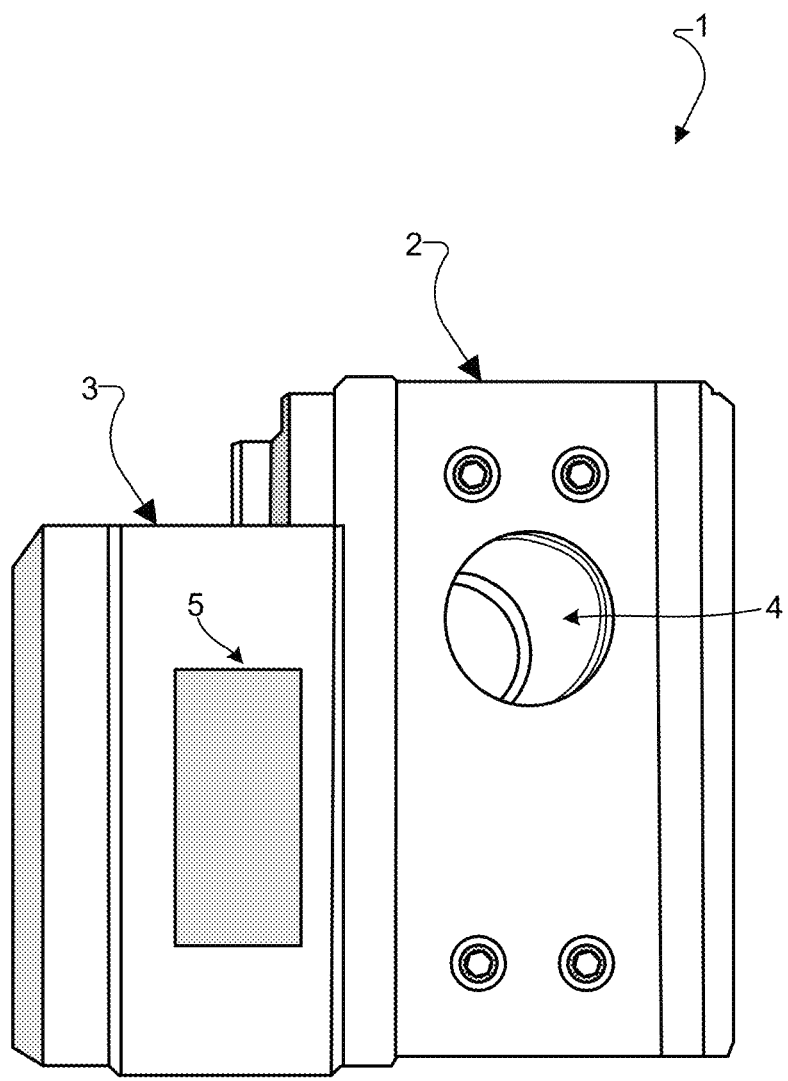
FIG. 1 is a top view of a wireless gas shutoff valve according to an embodiment.

The various embodiments will be described in detail with reference to the accompanying drawings. Wherever possible, the same reference numbers will be used throughout the drawings to refer to the same or like parts. The drawings and references made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

While the various embodiments have particular utility as a shut off valve for use in natural gas lines, such as on gas supply lines to residences, the valve embodiments and the control mechanisms are not limited to such applications. The embodiments may also be used to provide a reliable, low cost and wirelessly-controlled shutoff valve useful in any application in which such characteristics are beneficial. Other example applications include industrial gas supply lines, gas pipelines and distribution centers, gasoline and fuel oil supply lines, water lines, hydraulic lines, vacuum lines, and drain and vent lines. Also, while the descriptions of the various embodiments refer to natural gas, the embodiments are not limited to a particular type of gas or gas supply line, and may be implemented on supply lines carrying propane, butane, methane, hydrogen, or any other combustible gas. Thus, references to "gas" and "natural gas" herein are merely for brevity and should not be construed as requiring or being limited to a particular type of fluid, unless specifically recited in the claims.

The various embodiments provide a low-cost safety valve for a gas lines and similar low pressure supply lines that can be remotely activated via a wireless network that is self forming and adaptive to provide reliability, flexibility and installation independent characteristics. A simple but highly effective closure valve provides low leakage sealing using a mechanism that is compatible with low energy actuators to enable long life battery-operated control circuits. The valve can be configured to be tamper proof and failsafe without significant changes to the valve design. A miniaturized controller and wireless network electronics module provides the control mechanism for actuating the valve, as well as reporting data regarding the valve status to external networks via an ad hoc wireless network. A variety of simple magnetic valve operating mechanisms can be implemented with the miniaturized electronic control circuits and the valve body. Such control actuation mechanisms enable self resetting or manual resetting valves. These unique features of the gas line shut off valve can provide important safety benefits at an affordable price. Further, the remote actuating and sensing capabilities enabled by the electronics can save utilities substantial costs over manually actuated safety and shutoff valves.

Wireless actuation of a gas shutoff valve offers important safety benefits to the public as well, as to fire and rescue personnel. In the event of a building fire or gas leak, emergency personnel can remotely engage the shutoff valves from a safe distance. Such shutoff commands may be executed from a remote control center, as well as from wireless actuators that may be installed in public safety vehicles. This remote and local control capability is enabled by the ad hoc wireless network that is supported by the wireless communication and control electronics. Since the wireless transceivers used to communicate with ad hoc wireless networks are highly affordable, all fire rescue and police vehicles could be affordably equipped with such actuators. This would enable public safety personnel to promptly shut all gas lines in a building without having to wait for a gas utility worker to arrive on scene. Actuated valves can be easily reset after an emergency, but the tamper resistant design of the valve precludes unauthorized opening of the valve, rendering the valves usable by utilities for controlling access to the gas supply.

Since the wireless control circuitry is programmable, additional safety features and monitoring sensors can be added to the valve design at relatively low cost. For example, temperature sensors, battery level sensor circuits, valve position sensors and tamper detection sensors can be added to the design, with information from these sensors relayed via the ad hoc wireless network to utility servers. Additionally, the valve electronics can be coupled to gas meters to provide a wireless gas meter data delivery network. This would enable remote gas meter reading without the need for replacing current gas meters or installing a dedicated communication network.

By using magnetic forces to maintain the valve ball in the open position, the various embodiments provide a mechanism that enables the valve chamber to be completely sealed to preclude gas leaks. To actuate the valve (i.e., close the valve), the magnetic force holding the valve ball into the open position is reduced or removed, thereby enabling the valve ball to roll into the closed position under the influence of gravity. The magnetic force of an exterior magnet may be removed by a number of mechanisms. In addition to enabling the valve chamber to be sealed, the use of magnetic forces to actuate the valve (or hold it open) obviates any need for electrical wires and connections from the valve chamber, which has safety advantages when implemented on supply lines carrying flammable or explosive fluids (i.e., gasses or liquids).

In a first example embodiment illustrated in FIGS. 7A-7D, an exterior magnet is positioned on an actuator gear which when rolled to the closed position moves the magnet away from the valve ball. This removes the magnetic force securing the ball in the open position, allowing it to roll to the closed configuration.

Figure 8A:
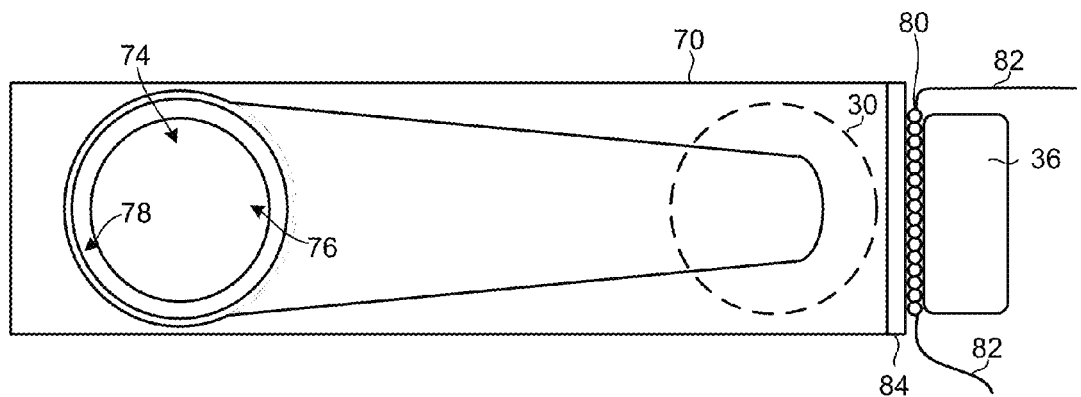
FIGS. 8A and 8B are top and side views, respectively, of a portion of the gas shutoff valve illustrating another embodiment actuation mechanism.
Figure 8B:
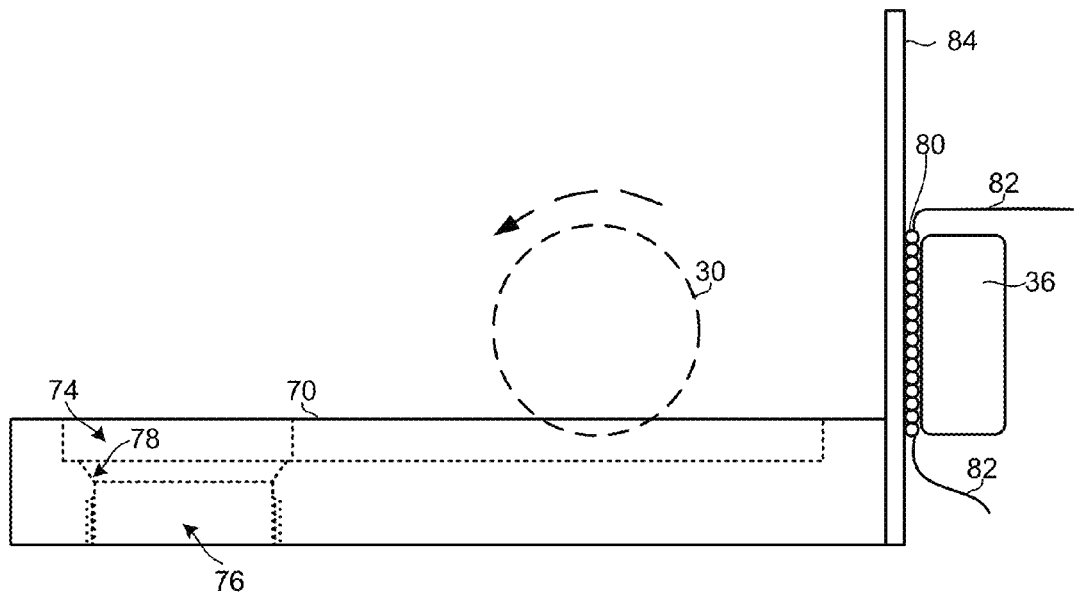

In a second example embodiment illustrated in FIGS. 8A and 8B, an exterior magnet positioned on the housing of the valve body is separated from the valve body case by a thin electromagnet (i.e., a coil of wire, such as a pancake coil). To close the valve in this embodiment, the control processor applies current to the electromagnet in a polarity that generates a magnetic field opposite that of the exterior magnet. This applied magnetic field reduces the amount of magnetic force that passes through the valve body to engage the valve ball. When the magnetic force is reduced, the valve ball rolls into the closed position as illustrated in FIG. 8B.

Figure 9A:
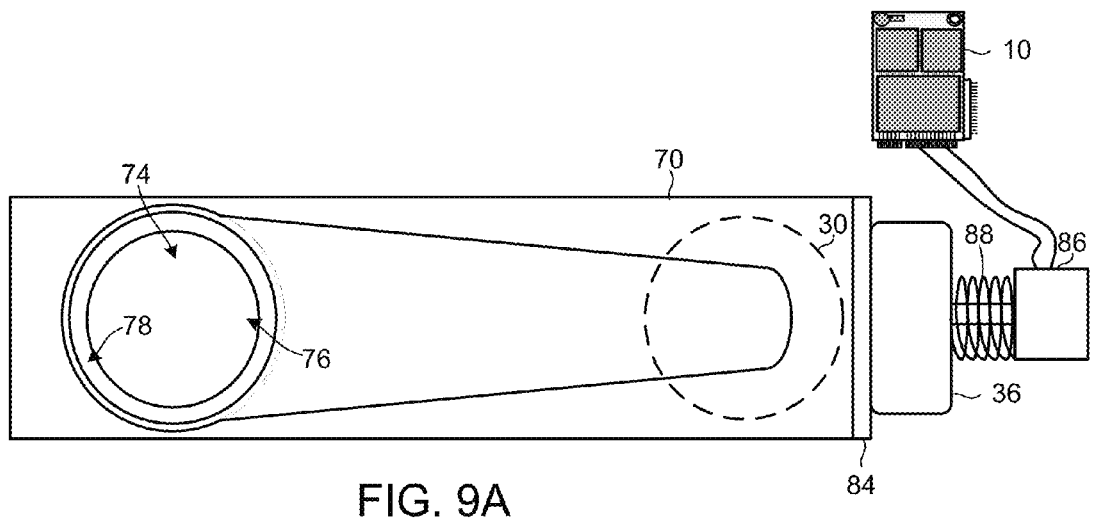
FIGS. 9A and 9B are top and side views, respectively, of a portion of the gas shutoff valve illustrating another embodiment actuation mechanism.
Figure 9B:
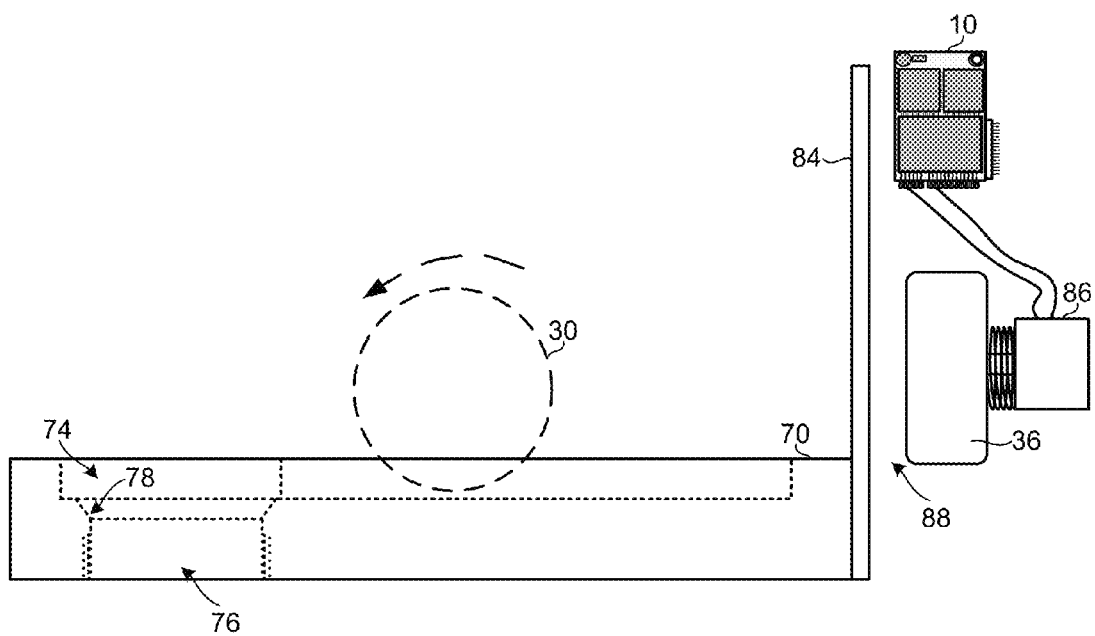

In a third example embodiment illustrated in FIGS. 9A and 9B, the exterior magnet is coupled to a solenoid type mechanism. To close the valve in this embodiment, the control processor applies a current to the solenoid which causes the exterior magnet to be withdrawn a short distance from the valve body. This additional separation between the exterior magnet and the valve ball reduces the amount of magnetic force holding the ball in place, thereby allowing it to roll into the closed position. Other mechanisms may be used for positioning an exterior magnet or magnetic field so as to hold the valve ball in the open configuration and reducing the magnetic force applied to the valve ball to enable the valve to be closed.

The processor in the valve system can be reprogrammed and updated via the ad hoc wireless communication network established by the processor with nearby like-equipped gas valves. In this manner, improvements and updates to the valve operating software can be deployed to all valves in a utility system without the need to individually service each valve. Further, authentication codes may be used to enable the valve control electronics to confirm that a valve shut command has been issued by an authorized computer or authority. Such authentication codes may be updated via the ad hoc wireless communication link. Periodic revisions to the command authentication codes may be transmitted in order to ensure that the valves do not become vulnerable to unauthorized actuation, such as by hackers.

In a further advantage provided by the various embodiments, the valve ball is held in place by a magnetic force which may be overcome by severe shaking or shock to the valve body. Thus, the embodiments provide a mechanism for automatically shutting gas lines in the event of a severe earthquake.

In an embodiment, the valve control electronics may include a temperature sensor, such as a thermistor, coupled to the control processor. The control processor may be configured through processor-executable software to monitor the temperature sensor and compare sensed temperatures to a maximum permissible value. In the event that the sensed temperature exceeds the maximum permissible temperature, the processor may automatically shut the valve by removing the magnetic force applied to the valve ball. In this matter, the valve can be configured to automatically shutoff the gas supply when temperatures in the vicinity of the valve indicate that the fire is present. This capability can reduce the chance for explosion in event of a building fire.

Other types of sensors may also be implemented with the various embodiments to provide further safety features. For example, a carbon monoxide sensor may be coupled to the control electronics, which may be configured with software to shut the valve in the event that measured carbon monoxide levels exceed a safe level. In this manner, the gas supply to a malfunctioning furnace, dryer, water heater, oven or other gas appliance may be shut off to minimize the chance of injury or death from carbon monoxide poisoning. An audible alarm may also be included as part of the valve assembly, and sounded by a signal from the control processor if a dangerous condition is sensed. As another example, natural gas sensors may be coupled to the valve electronics which may be configured with software to actuate the valve (i.e. close the valve) in the event that the sensor indicates the presence of natural gas in the exterior atmosphere at levels exceeding a safe level. In this manner, the valve body valve assembly can automatically actuate to reduce the potential for explosion in the event of a gas leak somewhere within the building. Other safety implementations may be implemented by leveraging the programmable processor coupled to the valve actuation mechanism.

In addition to closing the valve in response to a sensed safety condition, such as any of tampering, high temperature, high carbon monoxide levels, or high gas levels, the control processor may also be configured to send an alarm message via the ad hoc wireless communication network to a server or control center. In this manner, the gas valve can alert authorities to the sensed condition, which may allow an appropriate response (e.g., fire, paramedic or gas company personnel) to be dispatched to the location in a timely manner without actions by the occupants (who may incapacitated, asleep, etc.). Thus, the various embodiments may be integrated with a region's public safety services at no additional cost to consumers, the utility or the community.

FIG. 1 shows a top view of an embodiment wireless gas shutoff valve 1. The wireless gas shutoff valve 1 includes a valve assembly 2 and an electronics module 3. A threaded opening 4 may be provided in a top surface of the gas valve configured to be threaded onto a standard gas supply pipe. In the embodiment illustrated in FIG. 1, the electronics module 3 includes an antenna assembly 5 that the electronic circuitry uses to establish wireless communication links with other similarly equipped gas valves, as well as with gateway and remote operator modules as described below with reference to FIG. 14.

Figure 2:
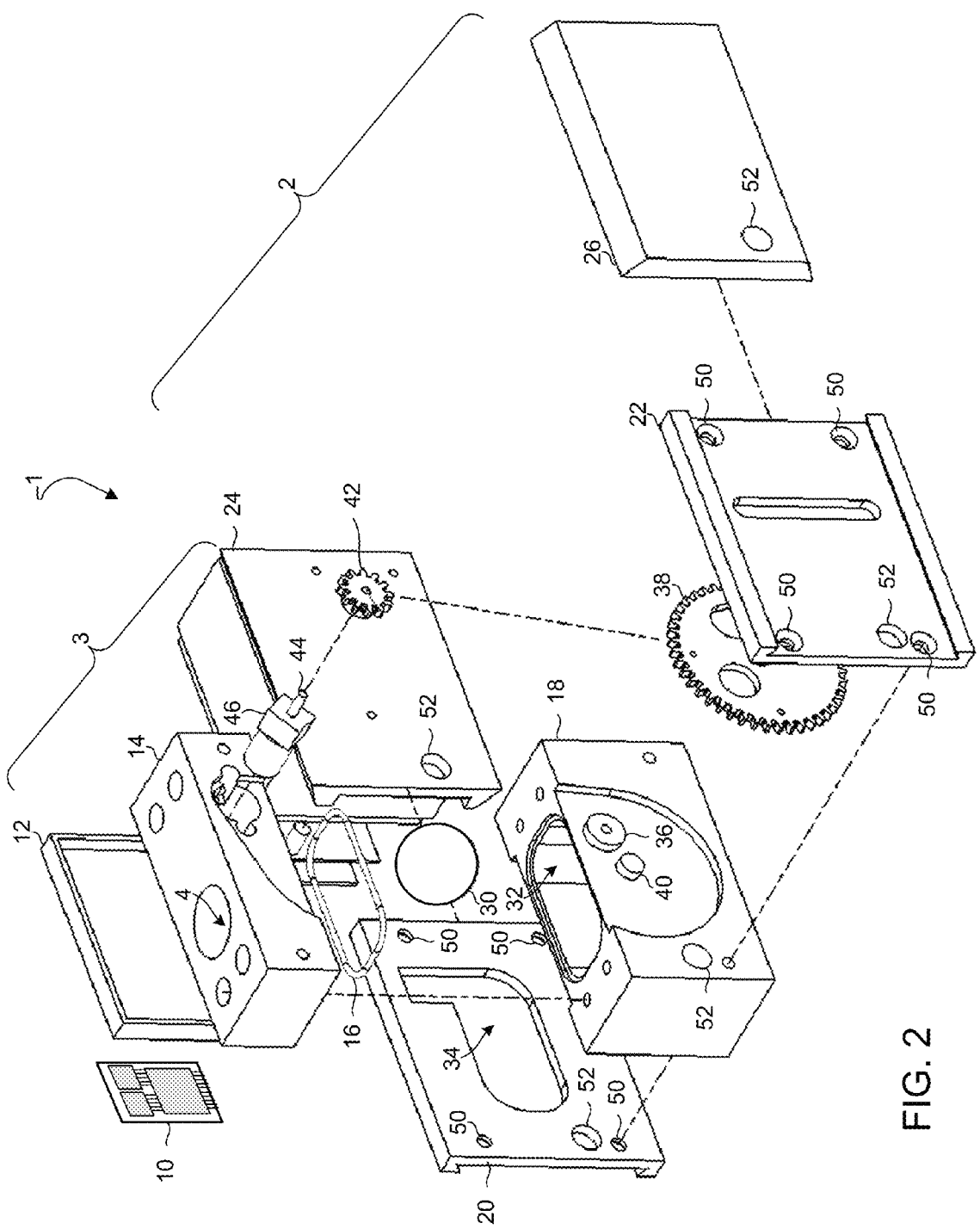
FIG. 2 is an exploded view of the wireless gas shutoff valve embodiment shown in FIG. 1.

FIG. 2 shows an exploded view of a wireless gas shutoff valve illustrating components of an example embodiment. A key element of the various embodiments is the wireless communication and control electronics 10 which enable programmable control of the valve and data communications via self established (i.e., "ad hoc") wireless communication networks. The wireless communication and control electronics 10 includes a control processor coupled to a wireless transceiver as described more fully below with reference to FIG. 10. The wireless communication and control electronics 10 is included within the electronics package 3 that is attached to the valve assembly 2 and enclosed by a cover 12.

The other key element of the various embodiments is the valve assembly 2 that is attached to the electronics package 3. The valve assembly 2 includes a valve ball 30 that moves freely within a valve interior 32 formed within a valve body 18. The valve interior 32 includes a valve seat 78 (see, e.g., in FIG. 4A) configured to form a seal with the valve ball 30 when the valve is in the shutoff configuration. Details regarding the valve seat are described below with reference to FIGS. 4A-4C. The valve interior 32 may be sealed on one side of the valve body 18, while the opposite side is sealed by a closure plate 20. The closure plate 20 may include a cutout portion 34 that cooperates with surfaces within the valve body 18 to form a ramp on which the valve ball 30 is induced to roll towards the valve seat 78 as described below with reference to FIGS. 4A-4C.

The valve interior 32 may be sealed on a top surface with a valve closure head 14. A ceiling O-ring 16 may be position to form a gas tight seal between the valve body 18 and the valve closure head 14.

As mentioned above, in the various embodiments the valve ball 30 is held in an open position by magnetic forces applied by a magnet 36 that is exterior to the valve body 18. Thus, the valve interior 32 can be completely sealed, with no valve actuation mechanisms penetrating the valve body (other than magnetic fields). The valve ball 30 is made from a ferromagnetic alloy, such as steel, nickel, an iron-nickel alloy, etc. In some embodiments, the ferromagnetic ball may be covered by a protective layer (not shown), such as plated metal, cladding or plastic (e.g., Teflon®) to protect the valve ball or enhance its operational reliability. In the embodiment illustrated in FIG. 2, this exterior magnet 36 may be moved with respect to the valve ball 30 by means of an actuator gear 38 that pivots about an axle 40 coupled to the valve body 18. In this embodiment, the exterior magnet 36 fits within an opening 37 in the actuator gear 38, as described more fully below with reference to FIGS. 7A-7D. The actuator gear 36 may be rotated by a drive gear 42 that is coupled by an axle 44 to a drive motor 46. The drive motor 46 is electrically coupled to the wireless communication and control electronics 10, as described in more detail below with reference to FIGS. 10 and 11.

In order to provide protection from tampering, the embodiment illustrated in FIG. 2 includes features that prevent unauthorized disassembly. In the illustrated embodiment, the valve body 18 is coupled between the closure plate 20 and a gear support plate 22, with the assembly held in place by fastening means or fasteners (e.g., bolts, rivets, etc.) passing through fastener holes 50. Any of a variety of conventional threaded fasteners may be used for coupling the closure plate 20, gear support plate 22 and valve body 18 together. To prevent unauthorized access to the threaded fasteners, the closure plate 20 may be covered by an inner cover plate 24 which connects to the closure plate 20 by means of a sliding attachment, such as a trapezoidal sliding dovetail connection as illustrated. Similarly, the gear support plate 22 may be covered by an outer cover plate 26 which likewise connects to the gear support plate 22 by a sliding dovetail connection or similar fastener-less attachment means. The use of a sliding attachment mechanism for connecting the cover plate 24, 26 to the closure plate 20 and gear support plate 22 enables the assembly to be locked together by means of a locking bolt that passes through locking bolt through holes 52 to prevent sideways movement of the cover plates 24, 26. Such a locking bolt 54 and lock 56 is shown in FIG. 3.

Figure 3:
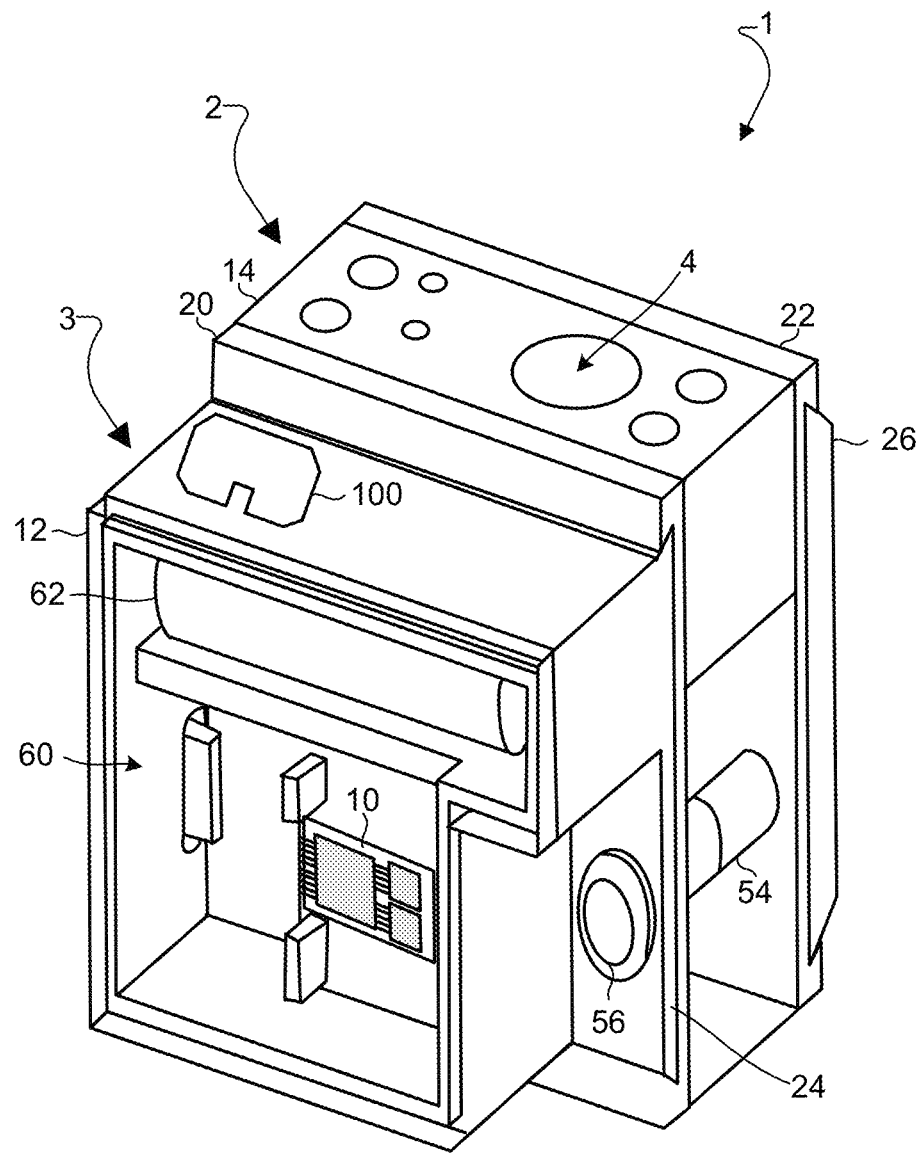
FIG. 3 is a perspective view of the wireless gas shutoff valve embodiment shown in FIG. 1.

FIG. 3 shows a perspective view of an embodiment which shows the electronics package 3 with the cover 12 removed to reveal the wireless communication and control electronics 10 and a battery 62 that powers the electronics and the actuator motor 46. In addition to housing the wireless communication and control electronics 10 and the battery 62, the electronics package 3 may include an interior volume 60 that may hold additional sensors as well as connectors for connecting to other devices, such as a gas meter (not shown). Also, the assembly includes an antenna 100 coupled to the transceiver 104 (see FIG. 10), that is designed to transmit and receive radio frequency signals. The antenna 100, it may be position on the electronics package 3 (as shown in FIG. 3) or on the valve assembly 2, such as on a top surface of the valve closure head 14, so that such structures become an integral part of the antenna design and improve antenna gain and impedance matching.

As mentioned above, the embodiments may be made tamperproof by means of a locking bolt 54 that passes through the valve body 18, cover plate 24 and gear cover plate 22. A lock 56 may be provided in the locking bolt 54 to permit the disassembly of the valve by one possessing a corresponding key.

Figure 4A:
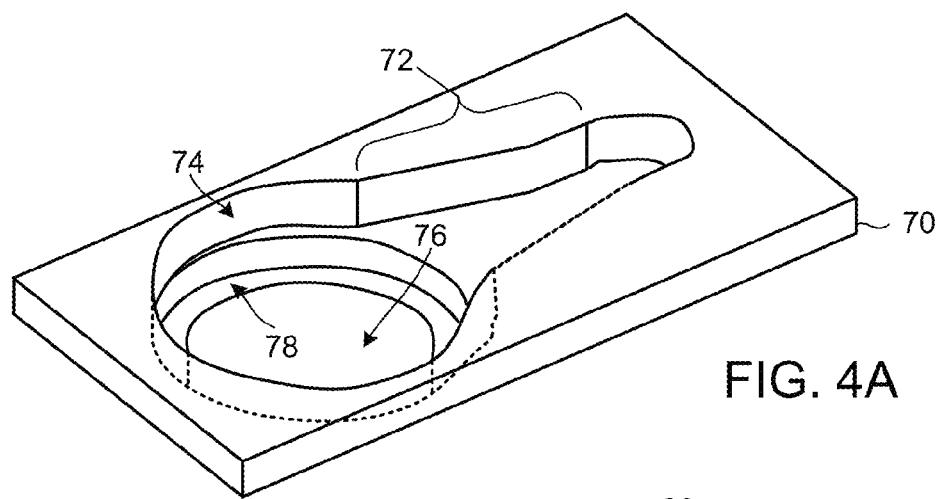
FIGS. 4A-4C are perspective views of a portion of the gas shutoff valve illustrating a principle of operation.
Figure 4B:
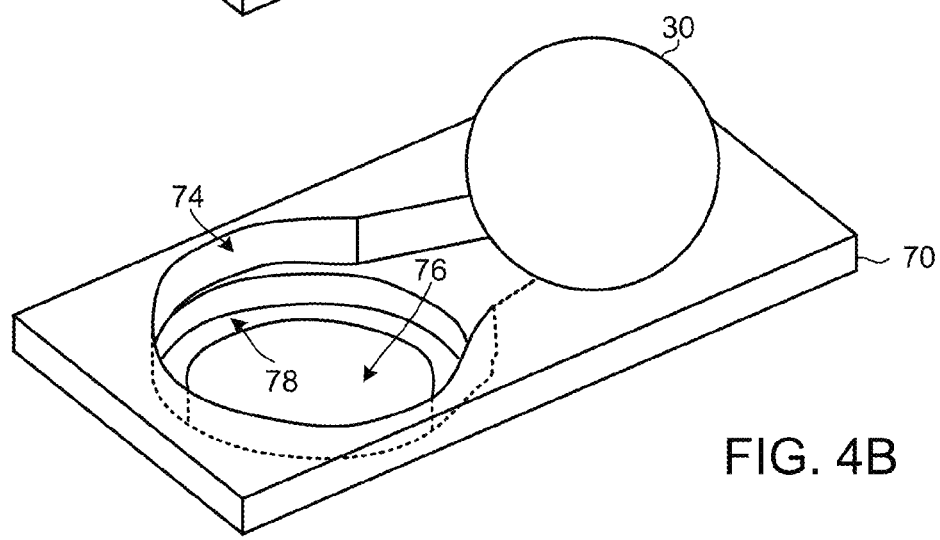
Figure 4C:
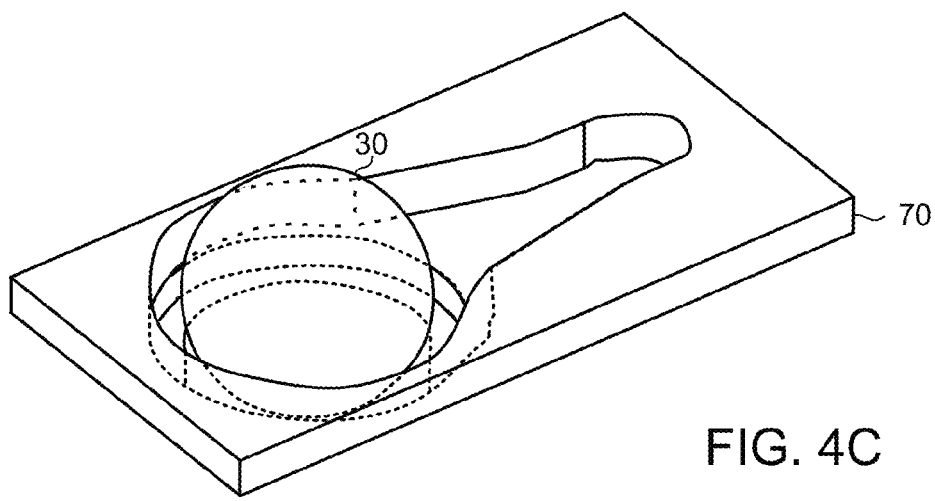

FIGS. 4A-4C illustrate details of the valve body which enable closure of the valve by movement of the valve ball 30 due to gravity. Referring to FIG. 4A, a bottom portion of the valve body 70 includes a cutout portion 74 which forms a V-shaped structure 72 that leads to the valve seat 78. As shown in FIG. 4B, the valve ball 30 rests on the edges of the cutout portion 74 of the bottom portion of the valve body 70. Since the edges of the cutout portion 74 diverge in the V-shaped portion 72, the valve ball 30 will rotate under the influence of gravity towards the valve seat 78. As a result, without any forces holding the valve ball 30 in place at the narrow end of the V-shaped structure 72, the ball will roll down and drop onto the valve seat 78, thereby blocking the exit port 76, as shown in FIG. 4C.

Figure 5A:
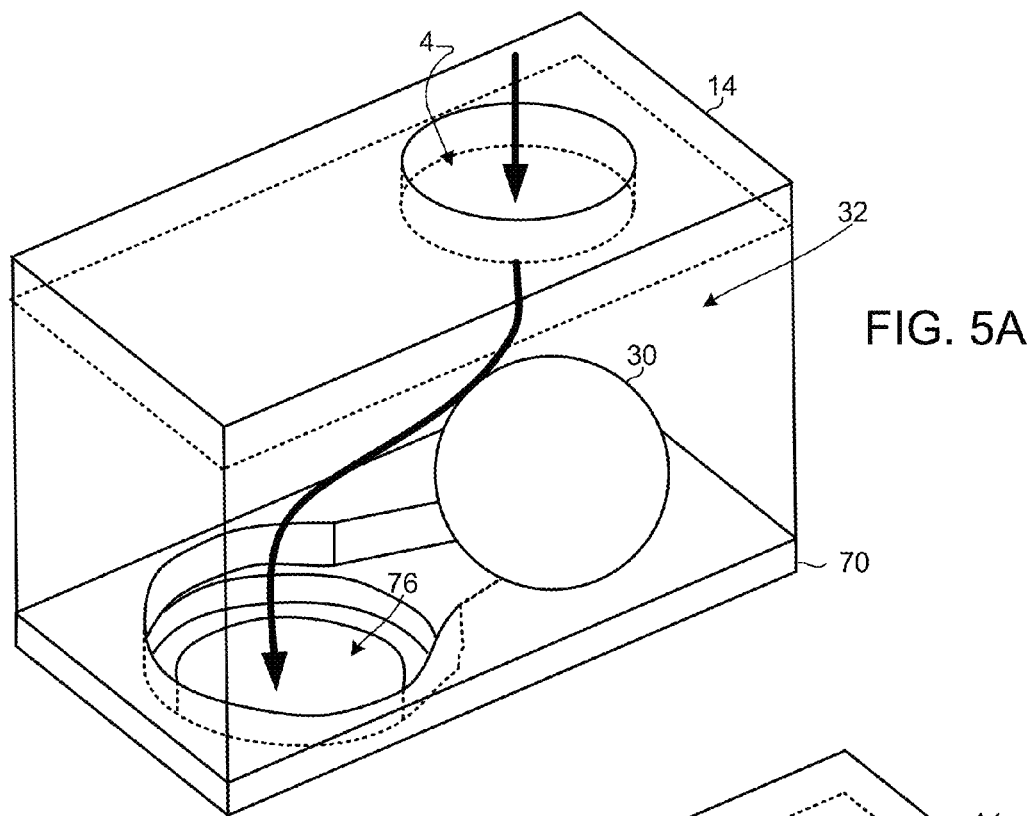
FIGS. 5A and 5B are cutaway perspective views of two embodiments of the gas shutoff valve illustrating flow of gas through the valve when in the open configuration.

FIG. 5A shows a cutaway view of a first embodiment of the valve body with a valve ball 30 in the open configuration to illustrate gas flow through the valve. As illustrated, fluid (e.g., natural gas or propane) flows through the threaded opening 4 at the top, such as from a connected gas supply line, around the valve ball 30 within the valve interior 32 and out the exit port 76, which may be threaded onto a gas line within the building in which the valve is installed. Provided that the valve ball 30 is in the open position, a large volume within the valve interior 32 permits gas to flow through the valve with very little pressure drop. However, when the valve ball 30 is in the closed position and resting on the valve seat 78, flow through the valve is prevented.

Figure 5B:
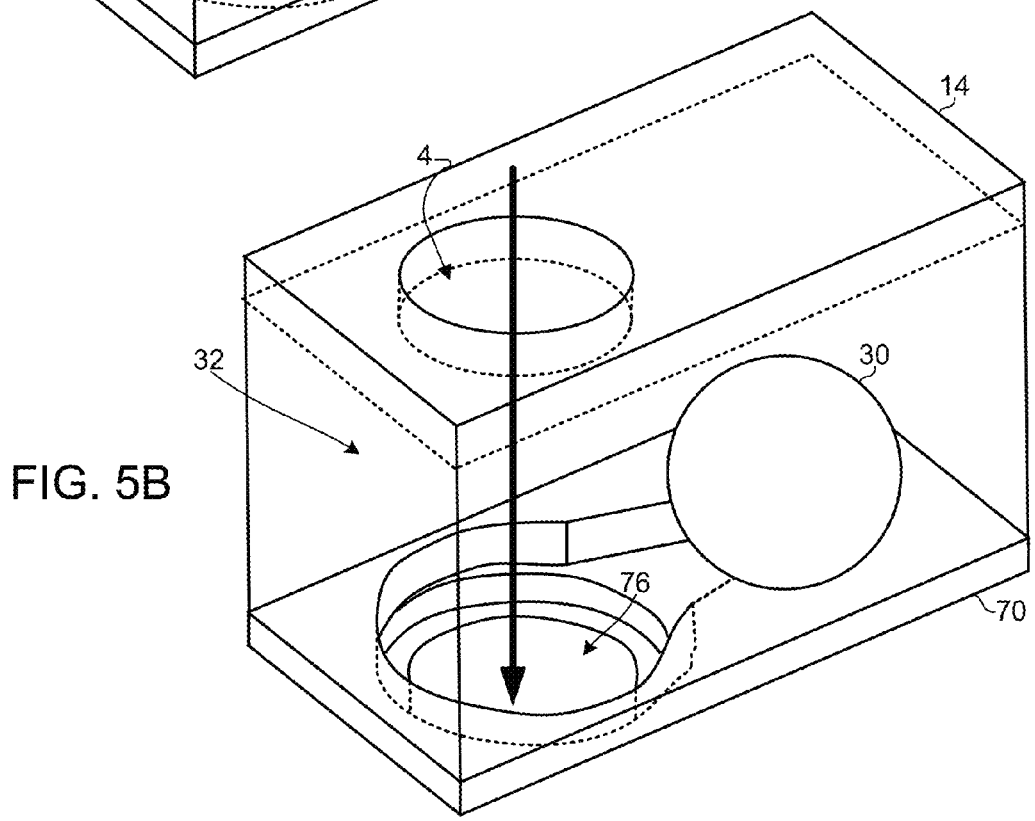

FIG. 5B shows a cutaway view of a second embodiment of the valve body with a valve ball 30 in the open configuration to illustrate gas flow through the valve. In this embodiment the valve inlet port 4 is positioned inline with the valve exit port 76 so that fluid flows straight through the valve which may reduce the pressure drop caused by the valve. Such configurations may be useful in low-pressure fluid supplies, such as natural gas lines.

Figure 6A:
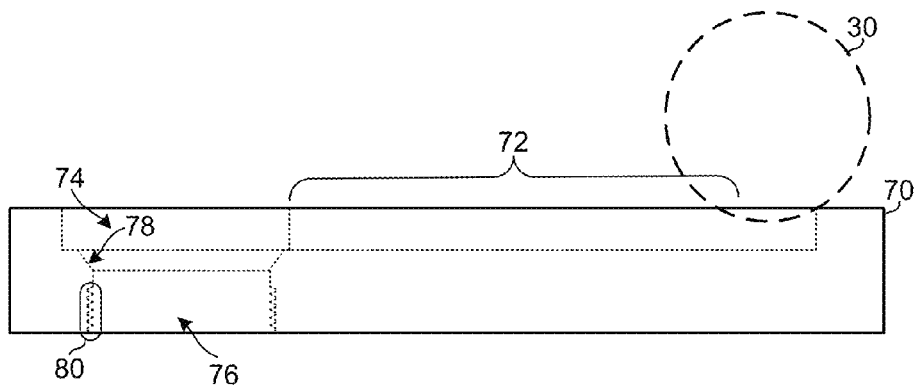
FIGS. 6A-6D are side and top views of a portion of the gas shutoff valve illustrating positions of the valve ball in the open and closed configuration.
Figure 6B:
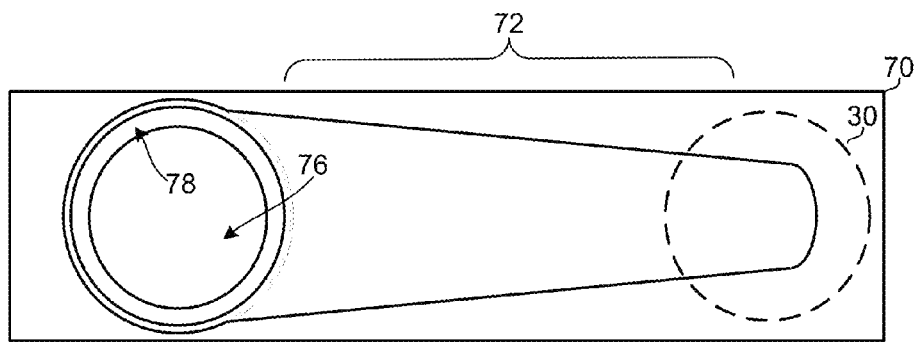
Figure 6C:
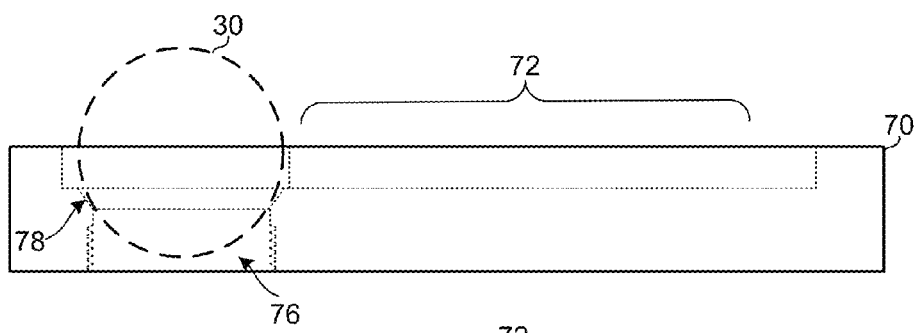
Figure 6D:
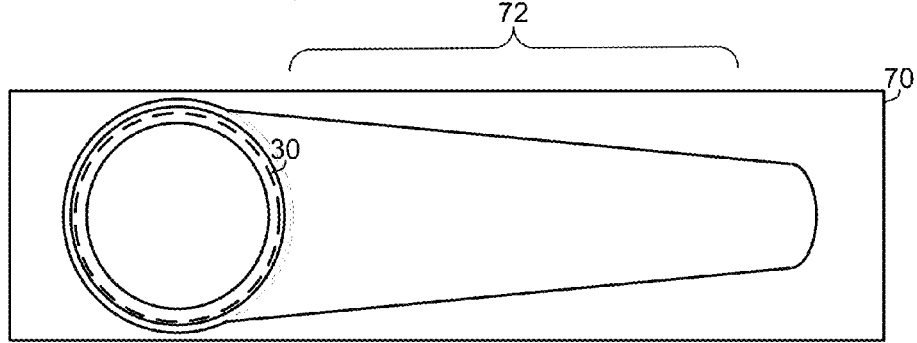

FIGS. 6A-6D illustrate further details of the bottom portion of the valve body 70 showing the valve ball 30 in the open configuration (FIGS. 6A and 6B), and in the closed configuration (FIGS. 6C and 6D). As shown in these figures, the valve seat 78 may be formed as a conical surface angling upward from the exit port 76 to the rest of the cutout portion 74. The angle and diameter of the conical valve seat 78 may be selected to reliably form a gas tight seal with the valve ball 30 when it is in the closed configuration as illustrated FIGS. 6C and 6D. Due to the V-shaped structure 72 and the lower portion of the valve seat 78, the valve ball 30 will tend to remain seated on the valve seat until moved by an exterior magnetic force as described more fully below. Thus, once the valve ball 30 is released as part of a valve actuation, the valve will remain in the closed configuration until an affirmative action is taken to reset the valve.

FIG. 6A also illustrates how the exit port 76 may include threads 80 which may be configured to form a threaded coupling with a standard gas line. So configured, the valve assembly can be attached to the valve line of a building simply by rotating the valve assembly to thread the exit port onto the threads of the valve line.

The V-shaped structure 72 enables gravity to move the valve ball 30 to the closed position with a wide tolerance on the angle of the valve when installed. Even if the valve is installed at an angle with respect to vertical such that the V-shaped structure 72 rises in the direction of the valve seat 78, the V shape will ensure that the valve ball 30 rolls towards the valve seat. However, such a V-shaped structure is not essential to the invention, and other configurations may be used to achieve the same purpose. For example, the valve assembly may be required to be installed in a level condition, in which case the V-shaped structure 72 may be replaced with a simple inclined plane.

As mentioned above, the various embodiments use magnetic forces to hold the valve ball 30 in the open configuration, such as at the narrow end of the V-shaped structure 72. To conserve battery power, such forces may be applied by an exterior permanent magnet 36, such as a rare earth magnet. For example, such a magnet may be made from neodymium or a neodymium-iron-boron (NdFeB) alloy. The valve body 18 may be made from a non-ferrous alloy, such as brass, which permits the magnetic field to pass from the exterior of the valve body 18 to the valve interior 32. When the exterior magnet 36 is positioned against the exterior surface of the valve body 18 at the narrow end of the V-shaped structure 72, the magnetic field reaching the valve ball 30 will be sufficient to hold it in position. To actuate (i.e., close) the valve, the exterior magnet 36 only needs to be moved away from this position far enough to reduce the magnetic forces on the valve ball 30 to the point where gravity causes the valve ball to roll to the closed configuration.

Figure 7A:
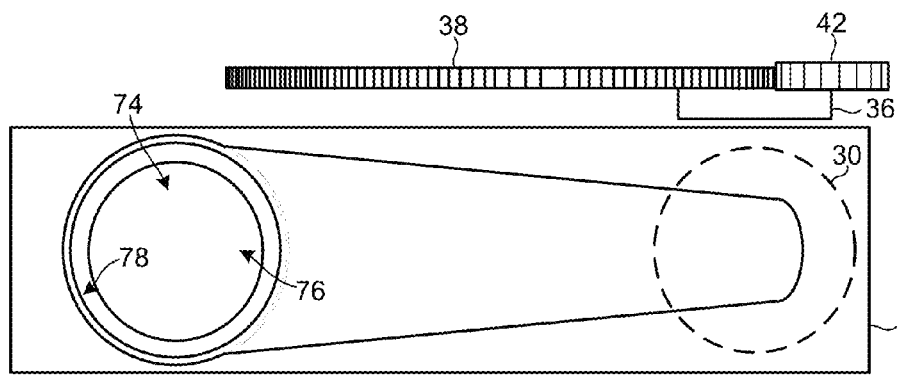
FIGS. 7A-7D are top and side views, respectively, of a portion of the gas shutoff valve illustrating an embodiment actuation mechanism.
Figure 7B:
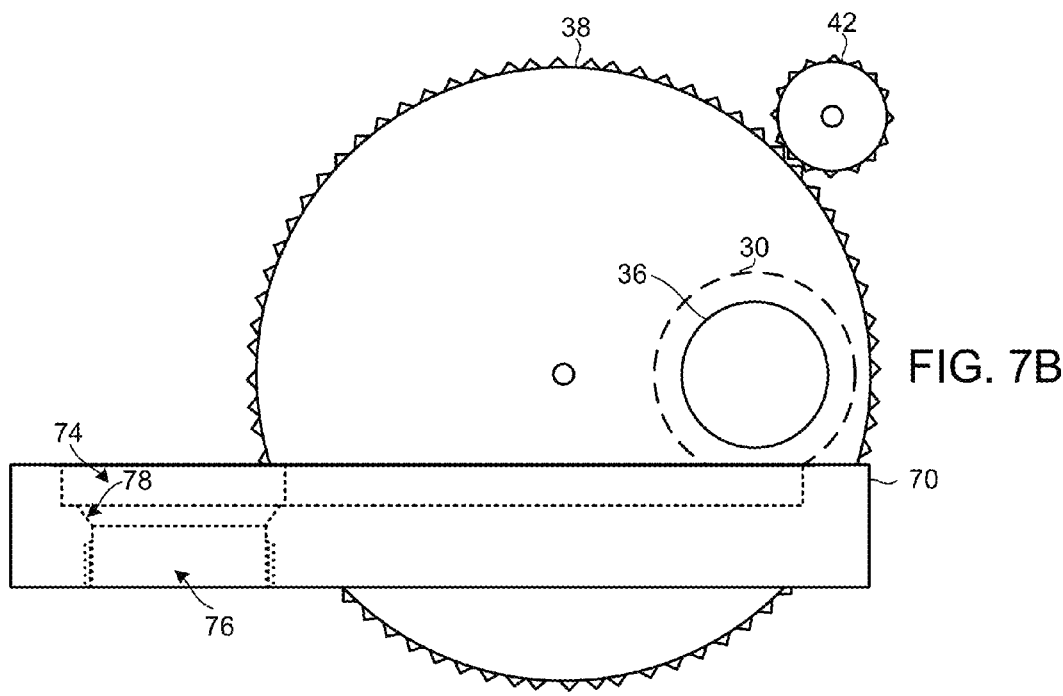
Figure 7C:
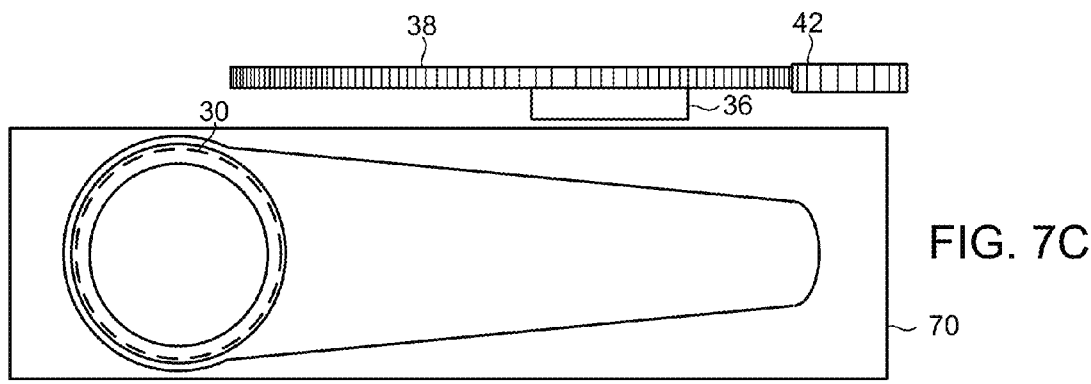
Figure 7D:
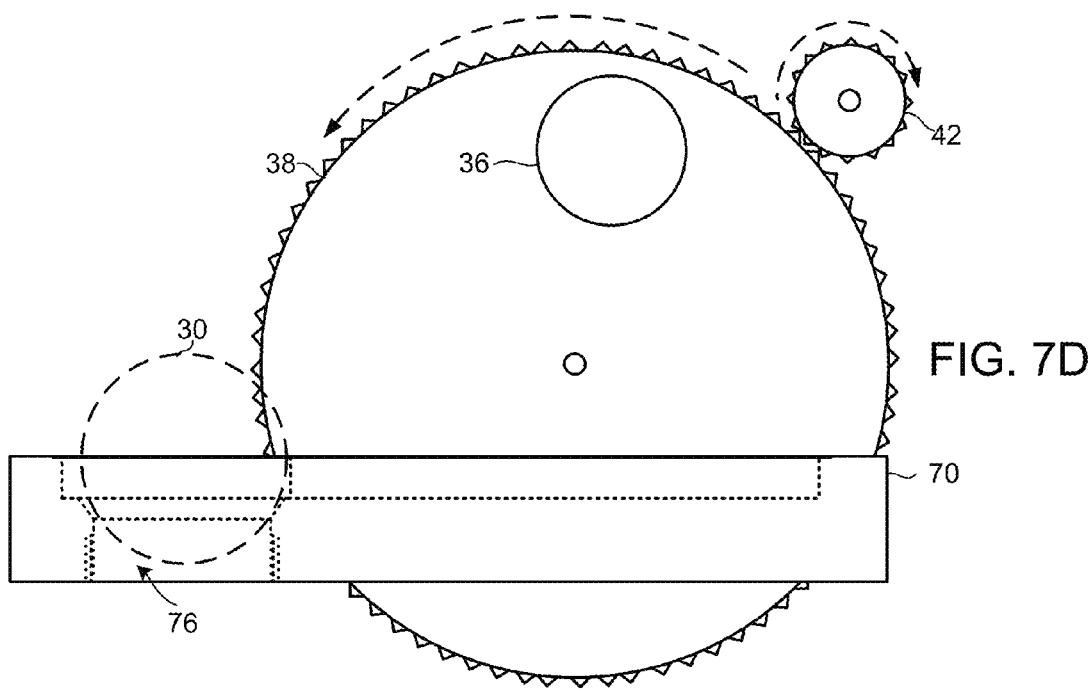

In an embodiment illustrated in FIGS. 7A-7D (which is also illustrated in FIG. 2), the exterior magnet 36 is coupled to an actuator gear 38 which when rotated to the position illustrated in FIGS. 7A and 7B, positions the magnet adjacent to the location of the valve ball in the open configuration. So positioned, when the valve ball 30 is moved to the open configuration position, the magnetic fields from the external magnet 36 will hold it in place. To actuate (i.e., close) the valve, the actuator gear 38 is rotating so as to move the exterior magnet 36 away from the valve ball 30. As illustrated in FIGS. 7C and 7D, this may be accomplished by rotating the drive gear 42 to cause the exterior magnet 36 to move up and away from the valve ball 30. Released from the magnetic fields of exterior magnet 36, the valve ball 30 then rolls down the V-shaped structure 72 and engages the valve seat 78.

Another example embodiment that applies a controllable exterior magnetic field to the valve ball 30 is illustrated in FIGS. 8A and 8B. In this embodiment, the exterior magnet 36 remains in the same position on an exterior wall 84 of the valve body 18. In order to reduce the magnetic forces passing through the valve body wall 84, an electromagnet 80 is positioned between the wall 84 and the permanent magnet 36. The electromagnet 80 is electrically connected by wires 82 to the wireless communication and control electronics 10. In an example embodiment, the electromagnetic 80 may be in the form of a planar or pancake coil of wire. To actuate (i.e., close) the valve, an electric current is passed through the electromagnet 80 with a polarity that induces a magnetic field which is opposite to that of the electromagnet 36. As a consequence of this reversed magnetic field, the net magnetic field passing through the valve wall 84 to be the valve ball 30 will be reduced to the point where the valve ball rolls towards the closed position under the force of gravity. This embodiment has the advantage of fewer moving parts. Since the electromagnet 80 only needs to be energized for a few seconds in order to actuate the valve, and valve actuation is presumed to be a rare occurrence, this embodiment should not result in a significant shortening of the battery life even though significant power may need to be applied to sufficiently disrupt the magnetic field of the external magnet 36.

A third example embodiment of a mechanism for controlling an external magnetic field is illustrated in FIGS. 9A and 9B. In this embodiment, the external magnet 36 is coupled to a solenoid 86, which includes a spring 88 that normally holds the external magnet 36 in close proximity to the valve wall 84 as illustrated in FIG. 9A. The solenoid 86 is electrically coupled to the wireless communication and control electronics 10. To actuate (i.e., close) the valve, an electric current is applied to the solenoid 86, which causes it to retract the external magnet 36, thereby moving it away from the valve wall 84 as illustrated in FIG. 9B. This increased distance between the external magnet 36 and the valve ball 30 reduces the magnetic forces on the ball so that the valve ball 30 rolls down the V-shaped structure 72 and into the valve seat 78.

The embodiments illustrated in FIGS. 7A through 9B are intended as examples of mechanisms that can be used to control an external magnetic field in order to cause actuation of the valve. Other mechanisms may also be used to achieve the same purpose. Also, some of the elements of the embodiments illustrated in FIGS. 7A through 9B may be combined or used with other features to accomplish the same purpose. For example, instead of connecting the external magnet 36 directly to a solenoid 86, a solenoid may be configured to move one end of a lever which causes a magnet on the other end of the lever to move much larger distance. As another example, a solenoid may be used to move the external magnet laterally or vertically, similar to how the magnet is moved by the actuation gear 38 illustrated in FIGS. 7A-7D.

Once the valve is in the closed configuration with the valve ball 30 resting on the valve seat 78, the valve will remain in the closed configuration until an external magnetic force is applied to lift the valve ball 30 back to the open configuration. In an embodiment, this valve reset operation may be accomplished by an individual applying a strong magnet to the outside of the valve assembly 2 and moving the magnet so as to lift the valve ball 30 back to the open position. This may be accomplished by a person placing a strong external magnet against the valve assembly just above the outlet of the valve and then moving the magnet along the side of the valve until it is under the supply inlet. Since the valve ball 30 will not remain in the open configuration unless the actuation gear 38 has been rotated so that the external magnet 36 is adjacent to the open location (e.g., shown in FIG. 7B), this valve reset operation cannot be performed without authorization (i.e., transmission of a valve open command). However, it is a simple enough procedure that a homeowner could perform the valve reset once a utility has transmitted a valve open command. For embodiments such as illustrated in FIG. 8A-9B, unauthorized resetting may be detected by the valve control processor sensing that the valve ball 30 is in the open configuration when a status bit in memory indicates that the valve should be closed. As described below with reference to FIG. 17, the processor may detect such an unauthorized open situation and re-perform the valve closure actuation.

In another embodiment, which may be implemented as a variation of the embodiment described above with reference to FIGS. 7A-7D, the valve actuation gear 38 and external magnet 36 may be configured so that movement of the gear can cause the external magnet 36 to follow a path along the side of the valve body 18 that will lift the valve ball 30 back to the open configuration. For example, the actuation gear 38 may be positioned so that rotation of the gear causes the external magnet 36 to rotate below the valve body 18 to cause the valve ball 30 to roll into the shut configuration, while additional rotation causes the external magnet 36 to rotate past the valve seat 78, thereby lifting the valve ball back onto the V-shaped structure 72 and back up to the open configuration. Thus in this embodiment, the valve shut actuation may involve rotating the actuation gear 38 through 90° (or so), while the valve open actuation involves rotating the actuation gear 38 in the same direction through 270° (or so).

Figure 10A:
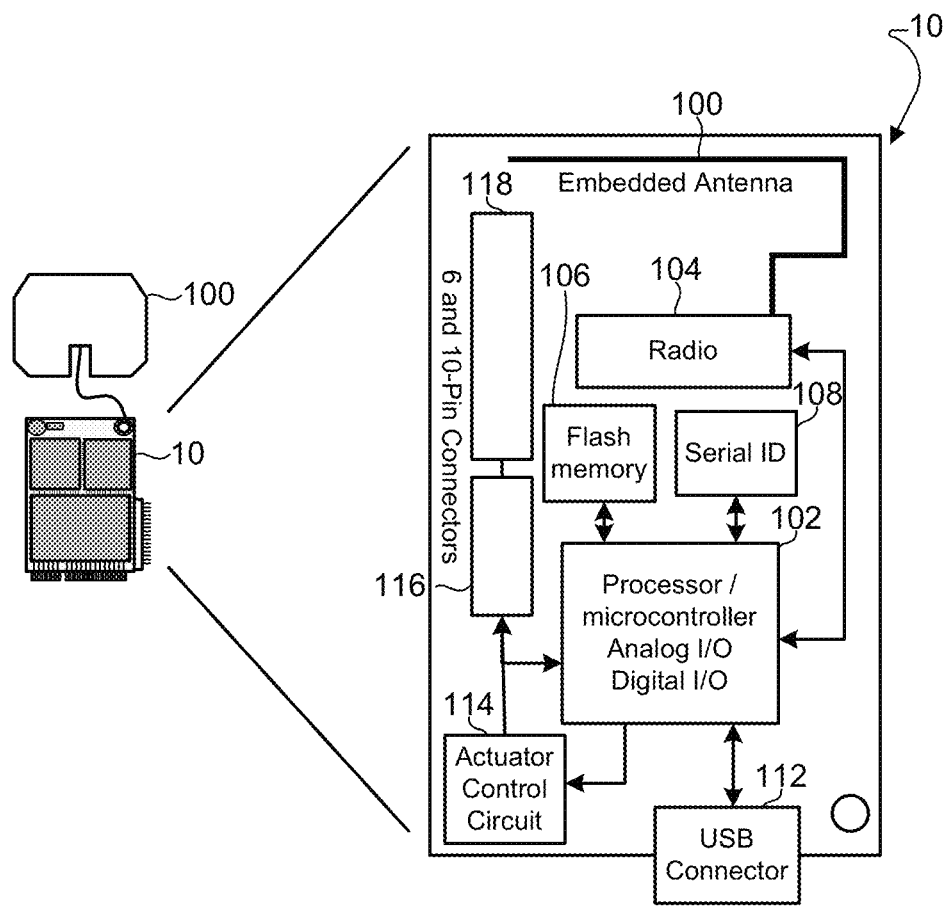
FIGS. 10A through 10D are circuit block diagrams and illustrations of alternative embodiments of control processors and wireless transceiver circuits.

An example embodiment of the wireless communication and control electronics 10 is illustrated in FIG. 10A. In general, such electronics will include a control processor or microcontroller 102 coupled to a wireless communication radio transceiver 104 which is coupled to an antenna 100. In an embodiment, the radio transceiver 104 is configured to send and receive RF signals according to the IEEE 802.15.4 standard. The control processor 102 and radio transceiver 104 together may be configured to autonomously establish ad hoc wireless networks with other similar devices, such as are enabled by the ZigBee or 6LoWPAN communication protocols. In some embodiments, the control processor 102 may include analog and digital input/output (I/O) circuits. The control processor 102 may be coupled to the memory 106, such as flash memory, for storing programs and data, including sensor data. The control processor 102 may also be coupled to read-only memory 108 for storing a serial identifier that the control processor 102 can communicate other devices in order to identify itself. The control processor may also be coupled to standard connections, such as a USB connector 112, 6 pin connectors 116, and 10 pin connectors 118 to enable connecting with other components within the valve assembly, as well as receiving programming and configuration data during assembly and test. The wireless communication and control electronics 10 will also include connections to battery power, as shown on FIG. 11, and other control circuitry. In an embodiment, the processor 102 may be coupled to an actuator control circuit 114 which includes components necessary to receive control signals from the processor 102 and transform them into signals or currents sufficient to achieve actuation of the valve actuator mechanism, such as a drive motor 46, electromagnet 80, or solenoid 86.

As illustrated in FIG. 10A, modern electronics enables the components of the wireless communication and control electronics 10 to be assembled in a small circuit board or chipset configuration. Further, the various components may be integrated into one or a few application specific integrated circuit (ASIC) to further reduce the size and cost of the electronic components.

The radio transceiver 104 may be configured to communicate using any of a variety of known communication technologies and protocols, including, for example, WiFi, Blue-Tooth®™, UWB (Ultra Wideband), IEEE 802.15.4, and ZigBee wireless communication protocols and standards. In an embodiment, the transceiver 106 complies with the IEEE 802.15.4 communication protocol or the ZigBee specification, which are known protocols for automatically establishing ad hoc wireless communication networks. The IEEE 802.15.4 communication standard and the ZigBee specification are hereby incorporated by reference.

In further embodiments, the wireless transceiver 104 may be a radio frequency identification (RFID) type transceiver, such as compliant with ISO standard 18000-6C, EPC Gen2, or EPCGen2 V2. A RFID tag, such as compliant with the EPC Gen2 V2 standard, may include a processor, memory, a transceiver radio and an antenna, with the processor and memory configured to query and/or receive signals from a sensor.

As is well known, RFID tags include an RFID transceiver that is configured to consume little if any power listening for a query or activation signal from an RFID type transmitter, referred to as an "RFID reader" in many applications. In RFID tag applications, the RFID transceiver may transmit a wireless signal in reply to a query signal received from an RFID reader, with some information (e.g., a tag ID number) encoded in the signal. RFID tags and their transceivers may be active or passive. Active RFID tags include a battery or other power source to enable a more complex encoded message to be transmitted, with enhanced communication range, in reply to a query signal from an RFID reader, such as information stored in a memory. Passive RFID tags harvest energy from the received query signal, such as using a rectifier circuit and a charge storage circuit (e.g., a capacitor or inductor) that are well known in the RFID tag technologies, and use the harvested energy to transmit a reply signal that encodes an ID number or code associated with the tag.

An embodiment of the wireless fluid valves including an RFID may leverage the capabilities of RFID type transceivers to enable an authority (e.g., a utility, emergency responders, facility managers, etc.) to program, control or query the valve without requiring an external power supply, replaceable/rechargeable batteries, or other large power source to power a transceiver to monitor for command signals.

An embodiment of the wireless fluid valve including a signal powered RFID transceiver includes a battery or other power source that is used to power the control processor 102 and actuator control circuit 114 once activated by signals received by the RFID transceiver.

Another embodiment of the wireless fluid valve includes an RFID transceiver configured to harvest electrical energy from command and other signals received from an RFID reader, and use the harvested electrical energy to power the control processor 102 and actuator control circuit 114.

Another embodiment of the wireless fluid valve includes an RFID transceiver configured to harvest electrical energy from command and other signals received from an RFID reader, and use the harvested electrical energy to power the control processor 102 in order to perform other operations, such as receive and store in memory configuration and/or valve information (e.g., a customer account number, an address where it will installed, etc.), receive and/or report sensor data, and report a valve close or open status.

Other uses of an RFID transceiver in embodiment of the wireless fluid valves will be evident from the following embodiment descriptions.

Figure 10B:
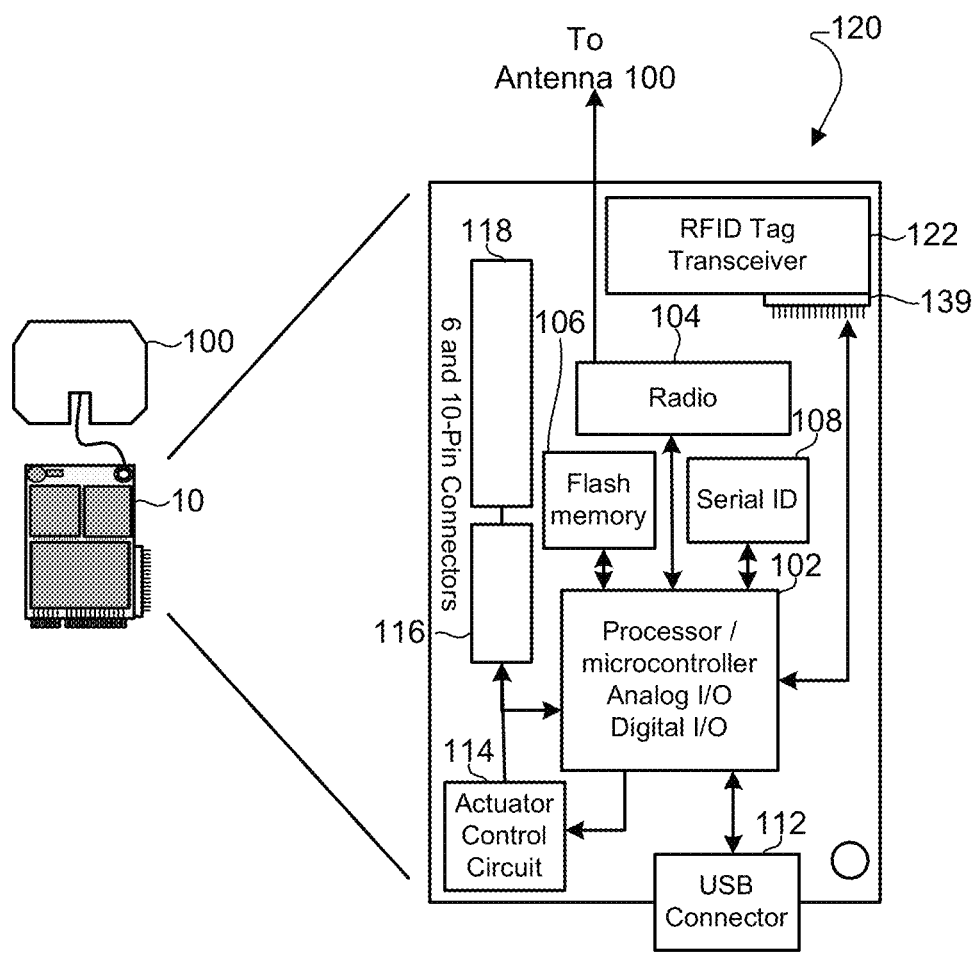

FIG. 10B illustrates an embodiment circuit board 120 that includes an RFID tag transceiver 122 coupled to the control processor 102. In addition to the like-numbered components described above with reference to FIG. 10A, this embodiment adds to the wireless communication and control electronics 10 an RFID tag 122 coupled to the control processor 102. The RFID tag 122 may include an Inter-Integrated Circuit ("IIC" or "I$^2$C") bus that is coupled to the control processor 102 for passing commands, data and interrupts between the two components. The RFID tag 122 may include its own internal RF antenna or may be coupled to an external antenna 100. The RFID tag 122 may be signal powered (i.e. powered by energy harvested from RF signals received from an RFID reader), battery-powered (not shown), or powered by a power source that powers the rest of the wireless communication and control electronics 10. More details regarding passive or signal-powered RFID tags are provided below with reference to FIG. 10C.

In the embodiment illustrated in FIG. 10B, a signal-powered RFID transceiver 122 and the control processor 102 may be configured so that signals received by the RFID transceiver wake up the processor so that it can activate another radio 102, such as a WiFi transceiver that can receive command messages from a transmitter or wireless network. This embodiment has the advantage that the wireless communication and control electronics 10 may be powered by a battery (not shown) to enable wireless communications and control of the valve actuation mechanisms, yet conserve battery power under most operating conditions by placing the electronics, including the control processor 102, in a dormant condition until activated by a wake up signal is received by the RFID transceiver 122. Using a signal-powered or passive RFID transceiver 122 that draws no power when dormant and receives its power from received wireless signals enables this embodiment to have a very long service life without requiring battery replacement or recharging.

In this embodiment, when an RFID type transmitter (or RFID reader) queries the valve by transmitting a wireless wake up signal, the RFID tag transceiver 122 harvests power from that wireless signal. Using power harvested from the wakeup signal, the RFID transceiver 122 may toggle a line on I$^2$C bus coupled to the control processor 102 to cause it to wake up. When the control processor 102 is activated, it may in turn activate a wireless transceiver or radio 104, such as a ZigBee, WiFi or Bluetooth transceiver, to establish a wireless communication like to a wireless network or another transceiver and listen for control commands. Prior to being woken up in this manner, the control processor and the rest of the electronics may be in a dormant state in which very little power is drawn from the battery. For example, an RFID equipped valve may be configured to consume less than 2 uAs when dormant, which is an order of magnitude less power than electronics that require the radio to be on to receive a command (which typically draw in excess of 10 mAs). Once activated and wirelessly connected to a wireless network or other transceiver, the wireless transceiver 104 may receive commands that are passed to the control processor 102 and transmit sensor data and valve position information as described in more detail below.

This embodiment enables the valve to be shut off in response to signals received by the RFID transceiver, because those signals cause activation of the control processor 102 that activates a second wireless transceiver 104 that receives the valve closure command that is passed to the control processor. While this embodiment involves a sequence of steps or operations, this added complexity may enable the valve to be configured to operate a long time on a battery due to the near-zero power drain possible when an RFID transceiver is used as the action-initiating receiver.

Figure 10C:
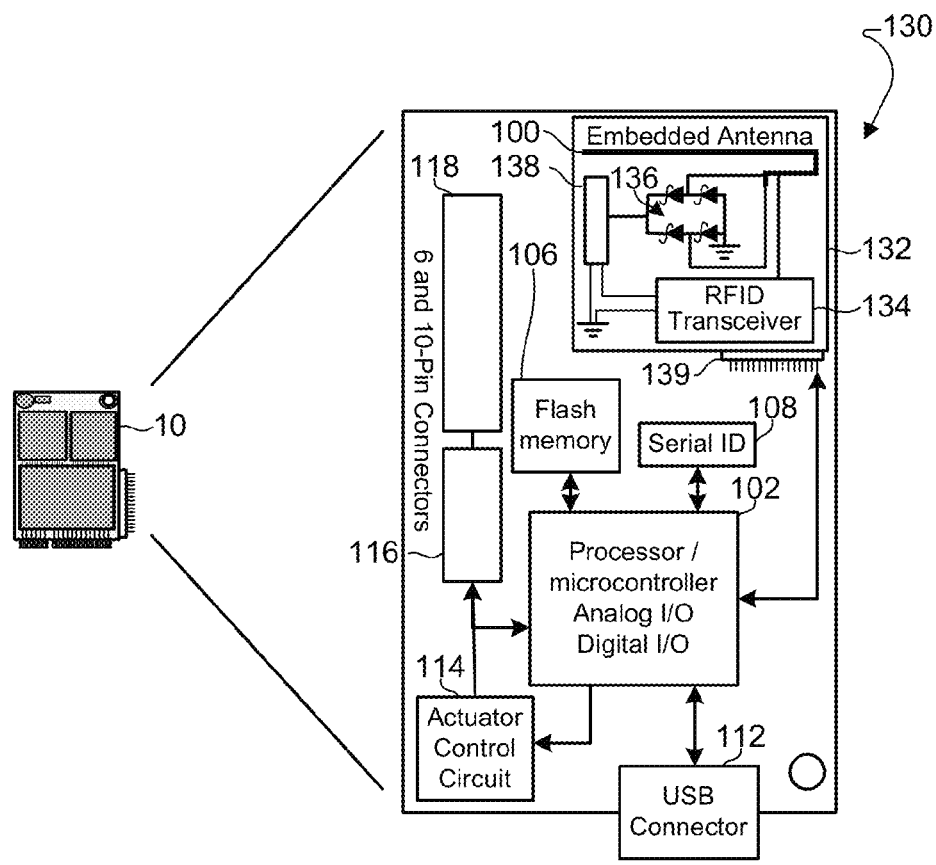

FIG. 10C illustrates another embodiment circuit board 130 including an RFID tag 132 that uses the RFID transceiver 134 as the transceiver for establishing wireless communication links for receiving command signals and transmitting sensor and/or status data. This embodiment has the advantage of not including a separate radio or transceiver, simplifying and reducing the cost of the electronics. In addition to being able to function in the manner described above with reference to FIG. 10A, this embodiment includes the advantages of a signal-powered transceiver that may enable the control electronics 10 to remain in a low power state until an RFID signal is received by the RFID tag 132 causing the control processor 102 to be awoken (e.g., by toggling a line on $I^2C$ bus) as described above.

FIG. 10C also illustrates some details of an RFID tag 132 suitable for use with various embodiments. A signal-powered RFID tag 132 may include an embedded antenna 102 that is coupled to the RFID transceiver 134 and rectifier circuit 136. The rectifier circuit 136, such as an array of rectifying diodes, may convert alternating currents induced in the embedded antenna 100 by the received RF signals into a direct-current voltage that may be stored in a capacitor 138 or other energy storage circuit (e.g., a rechargeable battery). Energy stored in the capacitor 138 may then be used to power the RFID transceiver 134 to send data via the antenna 102 sends signals to the control processor 102 via the $I^2C$ bus.

In this embodiment, the RFID transceiver may also be powered by a power source, such as a battery, that powers the other components in the wireless communication and control electronics 10 when activated so that the RFID transceiver 134 may be used to establish a connection to a wireless communication network and pass received messages (e.g., command signals) to the control processor 102, such as via the $I^2C$ bus.

Figure 10D:
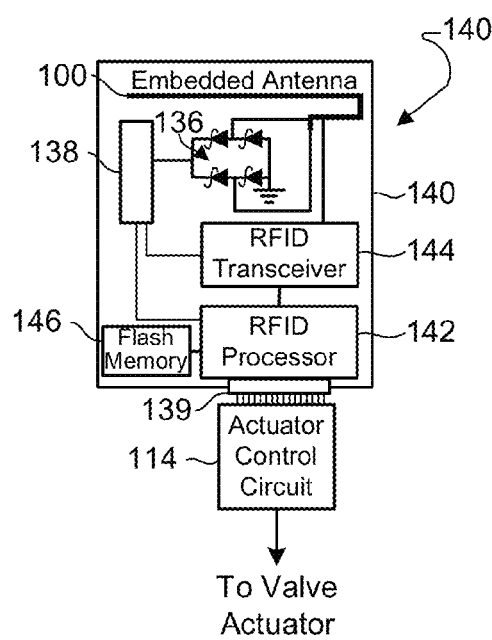

FIG. 10D illustrates another embodiment of the control electronics that uses a processor 142 within a self-power RFID tag 140 to control operations of the wireless fluid valve. This embodiment has the advantage of being self power and using a low-cost RFID tag components. As described above with reference to FIG. 10C, the RFID tag 140 may harvest energy from RF signals received via the antenna 100 in an energy harvesting circuit 136, and store the harvested energy in a capacitor 138, rechargeable battery or other energy storage element. The RFID tag 140 may include a processor 142 and persistent memory, such as flash memory 146, coupled to the processor. In this embodiment, information received via the RFID transceiver (e.g., set up and configuration data) and/or from a sensor (not shown) may be stored in the memory 146 by the processor 142, and then included in messages formatted by the processor 142 and transmitted by the transceiver 144.

In this embodiment, the processor 142 may be coupled to an actuator control circuit 114 that may be configured to send actuation signals to the valve actuator as described above with reference to FIG. 10A. In an embodiment, the processor 142 may be coupled to the actuator control circuit 114 via an $I^2C$ bus. In an embodiment, the actuator control circuit 114 may receive power (such as through the $I^2C$ bus) from the capacitor 138 or other energy storage element of the RFID tag 140. In another embodiment, the actuator control circuit 114 may receive power from another power source (not shown), such as a battery, another energy harvesting component, or an external power source.

Embodiments including a signal-power RFID tag provide other advantages, such as the ability to configure, provision and update software programs for the wireless fluid valve for operation before the valve is installed or connected to power. For example, with the valve off and still in the box, an installer may provision the valve with valve configuration information, such as a customer account number, an address where it will installed, verification codes, IPv6 address, etc., by sending such information to the valve using an RFID reader (or "flasher"). RFID tags being introduced to the market include large capacity memories, such as up to 64 kilobytes, and thus can store a significant amount of provisioning and configuration data. RF energy emitted by the RFID reader or flasher powers the RFID tag 132 via its energy harvesting circuit 136 and energy storage element 138. The harvested energy may then use the harvested energy to power the processor 102, 142 to receive the valve information and store the information in flash memory 106, 146. Because RF energy will pass through space and boxes, this provisioning of the wireless fluid valve can be performed at a distance without unpacking the valve from the box. Thus, these embodiments may enable provisioning and configuration of wireless fluid valves in the warehouse, upon leaving the warehouse (e.g., passing through an RFID portal), in the delivery van, or while being carried to the installation location. This flashing configuration process consumes no power from the valve as it is powered by the RF signals emitted by the RFID reader/flasher, and thus does not consume power from an included battery or require the valve to be connected to a power source.

The control processor 102 may be any programmable microprocessor, microcomputer or microcontroller that can be configured by software instructions to perform a variety of functions, including the functions of the various embodiments described herein. In a preferred embodiment, the control processor is of a type known as a "mote" which is a miniaturized microcontroller that is optimized for use with devices complying with the IEEE 802.15.4 specification. For example, in an embodiment, the control processor may include a "Single-Chip 2.4 GHz IEEE 802.15.4 Compliant and ZigBee™ Ready RF Transceiver" (part number CC2420), and a "16-Bit Ultra-Low-Power MCU, 8 KB Flash, 2 KB RAM, CC1101 Radio, AES-128, 12 Bit ADC, USCI" (part number CC430), both manufactured by Texas Instruments, Inc. In the embodiment described above with reference to FIG. 10D, the control processor 102 is a programmable processor that is part of the RFID tag.

In an embodiment, the transceiver or control processor may be assigned a unique Internet protocol version six (IPv6) address. This embodiment enables the valve to be addressed within the existing IP infrastructure for communication. In an embodiment, the wireless device employing the IEEE 802.15.4 protocol or ZigBeeIP, the transceiver may be configured to have a unique IPv6 address. The use of IPv6 addressing may enable individual valves of the various embodiments to be monitored and controlled from a remote location via a standard Internet connection to the wireless transceiver or wireless network communicating with a wireless transceiver 104 in the valve.

Since the wireless communication and control electronics 10 based upon a programmable control processor 102, the functionalities of the electronics can be defined by the processor-executable instructions used to program the processor.

An example of operations that may be programmed into the processor 102 are described below with reference to FIGS. 15-17.

Figure 11:
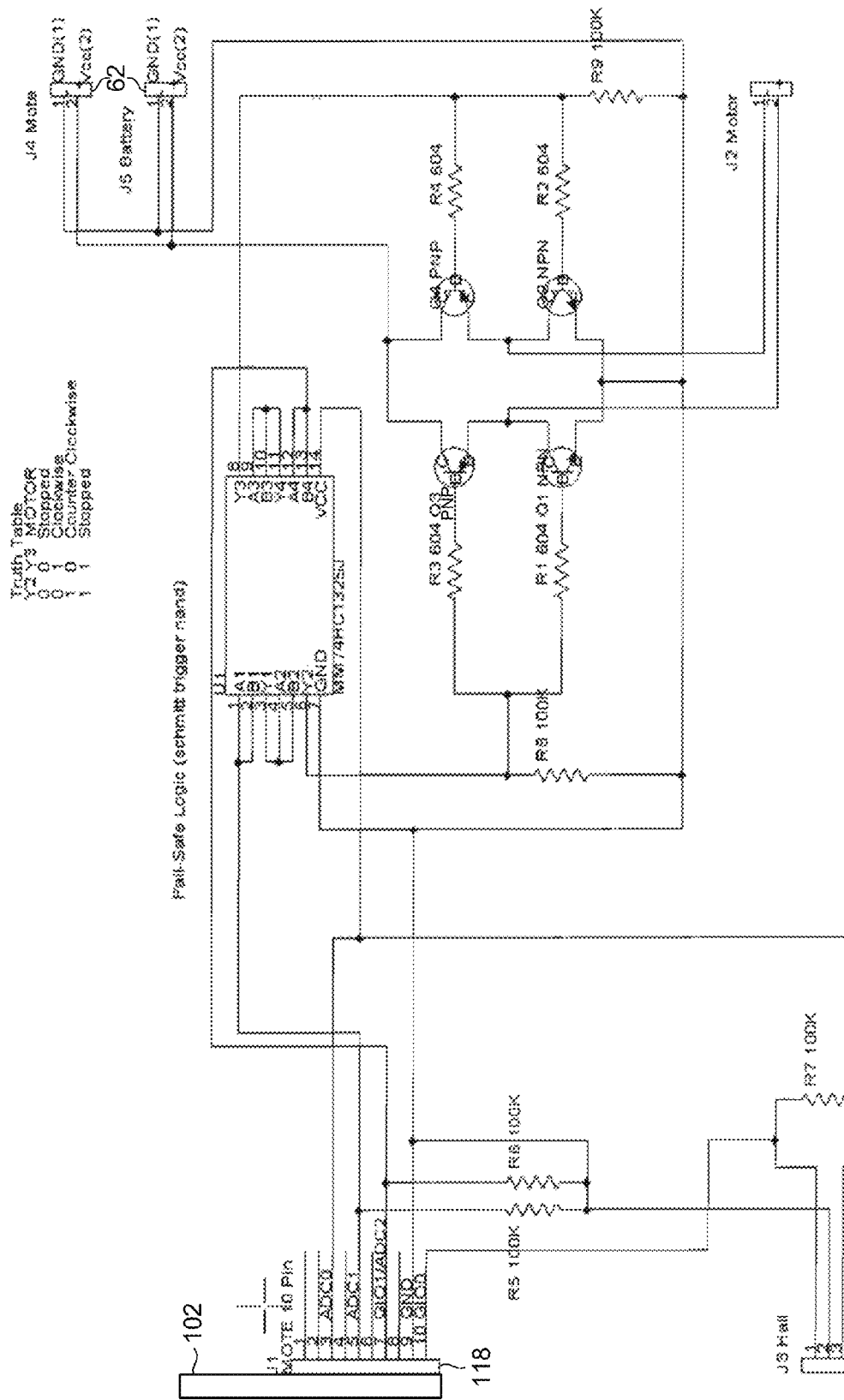
FIG. 11 is a circuit block diagram of circuit elements may be used in an embodiment for controlling a motor actuator.

In the various embodiments, wireless communication and control electronics 10 may be designed using power efficient components to minimize the power drain on a battery or other power source. Further, the control processor 102 may be configured with software to minimize power drain by minimizing the time that the electronics are energized. For example, the processor may be configured to place itself and other components in a low power "sleep mode" a majority of the time. The processor may wake up and energize the wireless transceiver 104 periodically and for a brief interval to check whether there are any wireless communications that need to be received and processed. Further, the processor may be configured to wake up and monitor RF signals on a known schedule synchronized among all similarly equipped valves to facilitate establishing ad hoc wireless communication networks for periodically relaying sensor and the status data to a central monitoring facility. In such embodiments, the drain on the battery 62 may be reduced to the point where the valve can operate for several years without requiring servicing. Methods for reducing power demand of wireless electronics are well known in the wireless communications arts, including other wireless devices designed according to the IEEE 802.15.4 wireless protocol, ZigBee specification Bluetooth and RFID protocols The wireless communication and control electronics 10 may include an actuator control circuit to enable the low power control processor 102 to activate the valve actuator mechanism, which may require higher power that supplied to the processor. FIG. 11 illustrates an example of such an actuator control circuit according to an embodiment. In this example circuit, the control processor 102 is coupled via a connector 118 to a gate logic circuit U1 provide fail-safe operation. Actuation control signals from the control processor 118 provided to the gate logic circuit U1 causes corresponding signals to be sent to switching transistors Q1, Q2, Q3 and Q4, which when energized couple the actuator mechanism, such as motor J2, to the battery 62. In the illustrated example circuit, the switching transistors are connected to the gate logic circuit U1 so that the polarity of voltage applied to the motor J2 can be controlled, so as to be able to drive the motor in two different directions. When no pulse is applied to the switching transistors Q1, Q2, Q3 and Q4, the motor J2 remains coupled to ground. Resistor elements R1 through R9 are included in the circuit to balance voltages and minimize bypass currents.

Figure 13:
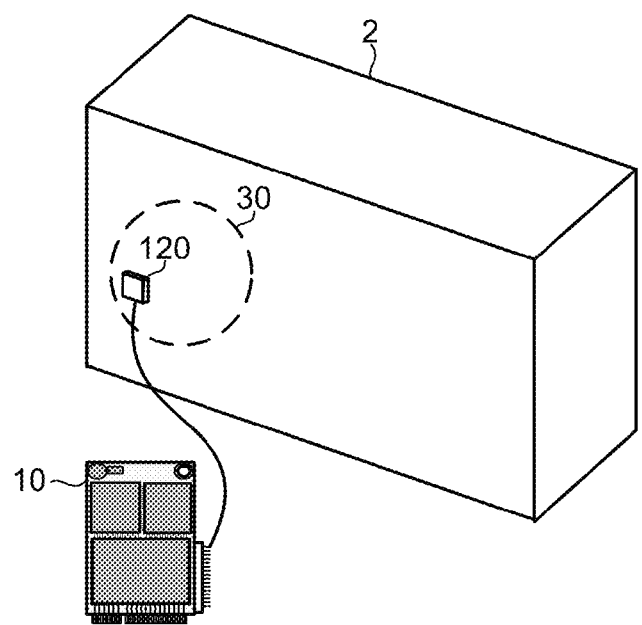
FIG. 13 is a perspective diagram illustrating a valve position sensor coupled to the valve body and to the control processor.

FIG. 11 also illustrates an example circuit for coupling the control processor 102 to a sensor, such as a Hall Effect sensor J3. The circuit enables the control processor 102 sense when the valve ball 30 is in the open or closed configuration by sensing its magnetic field via the Hall Effect sensor J3 which may be placed in an appropriate location on the valve assembly 2, as shown in FIG. 13. Other types of sensors, such as temperature sensors may be electrically coupled to the control processor 102 using similar circuits as are well known in the art.

It will be appreciated by one of skill in the electrical arts that the circuit design illustrated in FIG. 11 is but one example of a control interface circuit that may be utilized in the various embodiments. Other control circuits may be used, particularly to meet the requirements of different types of actuation mechanisms (e.g., electromagnet 80, solenoid 86) which may require different levels of current and voltage as well as different control signals.

Figure 12:
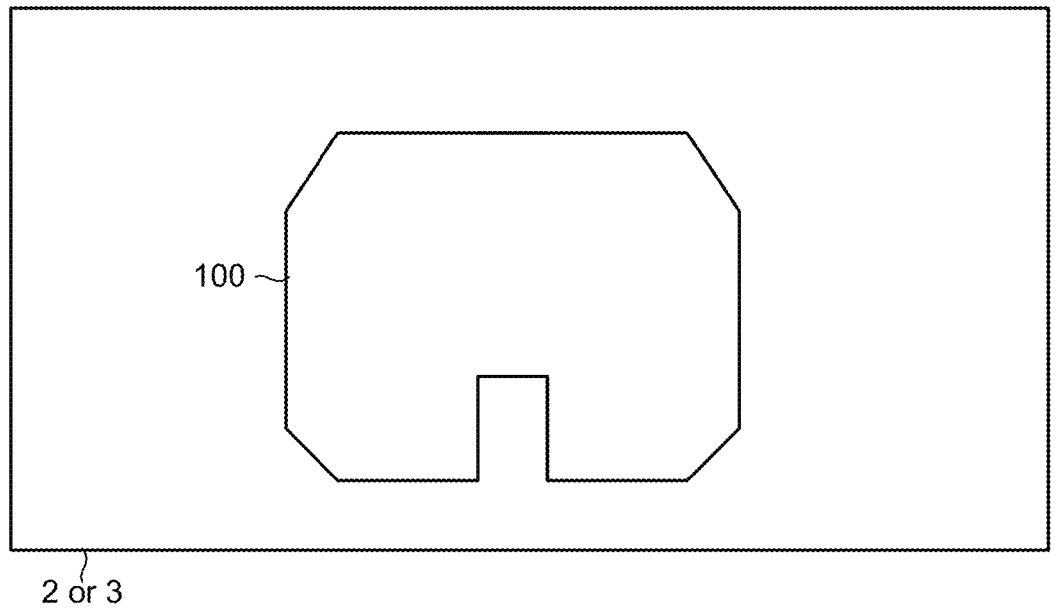
FIG. 12 is a top view of an embodiment antenna for use with the wireless transceiver.

In order to improve antenna gain, the various embodiments may position the antenna 100 on the valve assembly 2 or electronics package 3 so that the metal structures of the modules become an antenna ground plane or other integral part of the antenna. This is illustrated in FIG. 12. This configuration optimizes the antenna for maximum gain and power efficiency. Another embodiment may incorporate an antenna design that is elliptically polarized to improve response to multipath signals and improve sensitivity. Further embodiments may implement diversity techniques within the antenna structure to decrease effects of multipath fading and improve wireless link quality.

As mentioned above, a variety of sensors may be coupled to the wireless communication and control electronics 10 for gather information regarding the valve condition (e.g., open vs. closed), external conditions (e.g., temperature, gas concentrations, etc.), and tampering. A wide variety of sensors may be used for this purpose. For example, FIG. 13 illustrates a Hall Effect sensor 120 coupled to the valve assembly 2 at a position that enables it to detect the position of the valve ball 30 by sensing the local magnetic field. For example, since the valve ball 30 is held in the open position by an external magnetic field, the magnetic field in the vicinity of the Hall Effect sensor 120 will be stronger when the valve ball 30 is in the open position. Comparing the signal from the Hall Effect sensor 120 against a threshold value stored in memory enables the control processor 102 to determine when the valve ball 30 is an open configuration.

Including a radio transceiver 104 configured to establish ad hoc wireless communication networks, such as the IEEE 802.15.4 standard, enables the various embodiments to reliably communicate data and receive actuation command signals without requiring the establishment of fixed communication networks. Thus, as embodiment valves are installed in structures, they will automatically detect other similarly configured valves within the vicinity and establish ad hoc networks autonomously. As new valves are installed within the same building or adjacent buildings, the ad hoc communication network will add such communication nodes to the wireless network. If any valve is removed (such as through tampering or loss of battery power) the ad hoc communication network will reconfigure, passing messages via the remaining active nodes. Further, ad hoc communication networks will autonomously configure themselves to reach out to a gateway node which may then connect to wide-area networks, such as telephone lines or the Internet. In this manner, valves within an ad hoc communication network can transmit data messages to a central server or facility, with the messages passing through the various nodes of the ad hoc network until they are received by a gateway node which then relays the messages via conventional network or Internet protocols. The methods and technologies for establishing such wireless ad hoc communication networks are well known in the arts and routinely used by devices designed according to the IEEE 802.15.4 and ZigBee standards.

In addition to providing robust and reconfigurable wireless networks, the radio transceiver 104 configured to establish ad hoc wireless communication networks of the various embodiments also enables groups of valves (e.g., the valves within a single building) to collaboratively or in aggregation by exchanging information and applying decision algorithms based upon aggregate sensor data and states. By sharing sensor data among a network aggregation of wireless shutoff valves, the aggregate may be able to detect, recognize and/or act upon sensor conditions building-wide hazards that fall below the decision threshold in any one valve. For example, if the electronics of several valves measure elevated levels of carbon monoxide or explosive gas, the aggregate may be recognize a fault condition and initiate an automatic actuation even when the concentration near any one valve is within safe limits. As another example, a network aggregation of valves may recognize a hazardous condition warranting automatic valve actuation based upon low gas pressure readings. As a further example, elevated temperature readings reported by a number of valves, perhaps in combination with a report of automatic actuation of one valve in response to a local elevated temperature may be processed by the network aggregate to recognize a building fire and initiate an automatic actuation of all valves in the building. Such aggregate cooperation and decision making may be implemented in the various embodiments through appropriate software programming of the valve control processors.

Another advantage provided by the radio transceiver 104 of the various embodiments is the ability of the wireless shutoff valves to autonomously establish ad hoc point-to-point wireless communication links with a suitably configured (e.g., with proper authentication codes or IDs) communication node, such as may be installed in a utility or public safety vehicle or carried by a utility worker. Such point-to-point wireless communication links may be established automatically as a communication node come within communication range of a wireless shutoff valve, such as when a suitably equipped vehicle drives by a building in which the valve is located. This enables communications to be established on a "drive by" basis, which may be useful in the event of a network issue (failure, disruption, etc.), failure of a neighborhood gateway node, and in installations too far removed from other valves or gateway nodes to establish a communication network link back to a home server, such as in rural neighborhoods where homes are located far apart. For example, in the event of a natural disaster, such as an earthquake or hurricane that knocks out normal communication networks (e.g., telephone and Internet) and/or power, this capability would enable utility or public safety officials to determine the valve configuration (i.e., open or closed), as well as gather other sensor data, from all valves within a neighborhood merely by driving a suitably equipped vehicle past the buildings.

In a further application of these capabilities, the control processor 102 may be configured with processor-executable instructions to store in memory 106 sensor data (e.g., valve position, temperature, pressure, external conditions) and/or data received from an external meter (e.g., a nearby gas or water meter) until such data is successfully communicated by an ad hoc wireless network. As described below with reference to FIG. 15, the control processor 102 may receive data from a variety of sensors and store the data in memory 106 and then transmit the data periodically or in response to a query. By storing sensor data until transmitted, the various embodiments enable wireless shutoff valves to retain weeks or months worth of data that can then be downloaded simply by moving a suitable communication node (e.g., within a utility vehicle) within communication range of the valve. Using a large enough memory 106, substantial sensor data, such as twenty years of data may be stored within the valve electronics. In this manner, utility and public safety personnel can obtain the stored data (e.g., the past twenty years worth of sensor data) from valves located in a neighborhood simply by driving through in a suitably equipped vehicle. This capability may be also be useful in the event of communication system disruptions, be they natural (e.g., earthquake, hurricane, etc.) or man-made (e.g., power cut off, disconnected networks or jamming), since the valve electronics are battery powered and will retain sensor data in memory until downloaded, such via a point-to-point network link established during a "drive by."

Figure 14:
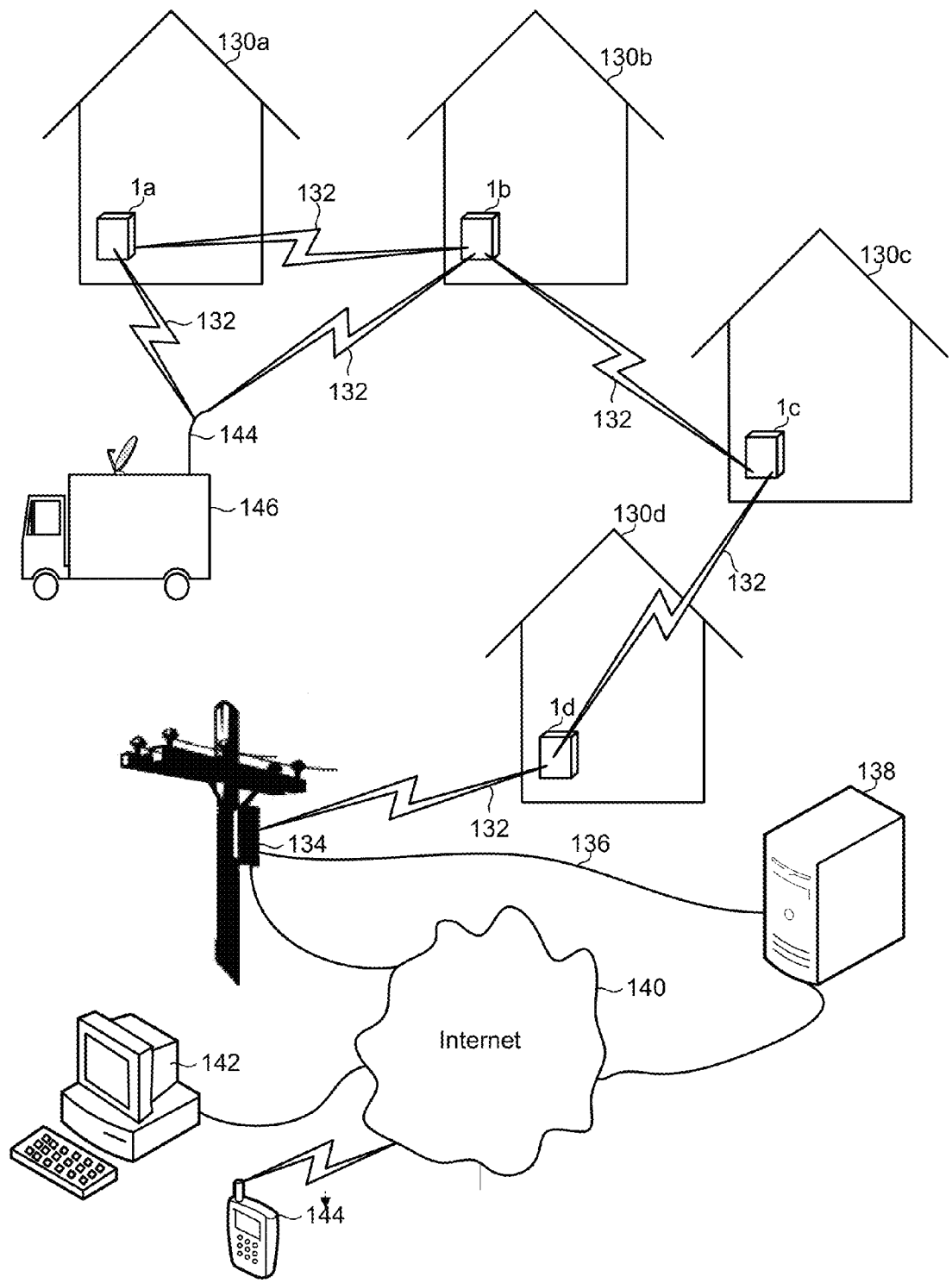
FIG. 14 is a communication network diagram illustrating communications among a number of gas shutoff valves within a wireless ad hoc communication network.

This communication network is illustrated in FIG. 14 which shows a plurality of embodiment valves 1*a* through 1*d* position within various structures 130*a*-130*d*. Each valve 1*a*-1*d* establishes a wireless communication link 132 with each other valve within range of the wireless link. For example, valve 1*b* establishes a wireless communication link 132 with nearby valves 1*a* and 1*c*. Similarly, valve 1*c* establishes a wireless communication link 132 with nearby valves 1*b* and 1*d*, and valve 1*d* establishes a wireless communication link 132 with nearby valves 1*c* and a gateway node 134 positioned on a nearby utility pole. In the illustrated example, the gateway node 134 is coupled via a hard wire network 136 to a central server 138, but may also or alternatively be coupled to the Internet 140. As a result of establishing such a wireless ad hoc communication network, valve 1*a* can send a message to the central server 138 by relaying the message through the other members of the ad hoc wireless network, namely the valves 1*b*, 1*c* and 1*d* to reach the gateway node 134. Similarly, the central server 138 can send command messages to valve 1*a* via the other valves 1*b*, 1*c* and 1*d* in the ad hoc wireless network.

An additional benefit of using wireless ad hoc networks is that other suitably equipped communication nodes can connect to the communication network in order to receive data signals and transmit actuation commands. For example, FIG. 14 illustrates a utility truck 146 equipped with the suitable wireless ad hoc communication transceiver 144. When the utility truck 146 drives within the communication range of any valve (e.g., valves 1*a*, 1*b*), the truck's transceiver 144 and the nearby valves 1*a*, 1*b* establish wireless communication links 132 which effectively adds the truck transceiver 144 to the ad hoc communication network. So connected, the utility truck 146 can now receive data from each of the valves 1*a*-1*d* communicating via the ad hoc communication network. Also, the utility truck 146 can issue actuation commands to any valves 1*a*-1*d* communicating via the ad hoc communication network. Thus, the utility truck 146 can issue commands to shut any one of the valves 1*a*-1*d* in the network, without the need to have the commands sent from the central server 138. Thus, by equipping all vehicles used by public safety (e.g., police, fire, rescue, etc.) with an appropriate configured communication transceiver 144, any authorized public safety official can shut valves within structures in the event of an emergency without having to physically enter the structures. Also, no special valve actuation tools are required, and the cost of the communication transceiver 144 (or configuring existing radios to access the wireless ad hoc networks) may be very affordable.

An additional benefit of the various embodiments is the data relayed to the central server 138 from the various valves 1*a*-1*d* may be stored in a database, such as an SQL database which may be coupled to a Web server hosted within the central server 138, so that information can be made available via computers 142 coupled to the Internet 140. In this manner, public safety personnel, such as police and fire dispatchers, as well as utility personnel can monitor the condition of gas valves throughout the community from their desktop, laptop or dashboard computers. Individuals with appropriate passwords and credentials may also be permitted to issue valve closure actuation commands via the central server 138 by sending commands to the server via the Internet 140, such as from a personal computer 142 or smart phone 144 (e.g., via an app on an iPhone®) with Internet access. The central server 138 may receive and authenticate such shut commands, and then send an appropriate valve shut command to the indicated valve 1a-1d via the wireless ad hoc communication network.

In order to provide security and avoid inadvertent or unauthorized closure of valves, each valve may be configured with a unique identifier, such as may be stored in a serial ID 108, and that the wireless communication and control electronics 10 can be used to identify itself to nodes within the wireless ad hoc communication network, as well as to recognize messages addressed to the valve. Additionally, wireless communication and control electronics 10 may store authentication codes and/or associated cryptographic algorithms which may be used by the control processor 102 to authenticate incoming command messages.

In a further embodiment, the location (e.g., address, room and floor) of each installed the valve 1a-1d may be recorded in a database, such as may be maintained on the central server 138. This capability would enable alarm messages communicating notable conditions, such as fire, tampering, valve actuation, etc., to be correlated to the precise location of the valve to enable prompt dispatch of fire, safety or utility personnel if appropriate.

In a further embodiment, wireless communication and control electronics 10 may be configured to estimate their own location relative to the location of nearby valves by using signal strength as a rough measure of separation distance and triangulation techniques. If some communication nodes, such as gateway nodes, are in a known reference position (e.g., on a telephone pole), valves can determine and report their estimated positions with respect to such reference locations. This ability to calculate their location from known reference points may enable valve electronics to generate or confirm valve location data without relying on installation data that may be incorrect or unavailable.

In a further embodiment, this relative location estimating capabilities may be used to provide public safety personnel with the approximate location of valves with respect to a vehicle equipped with a communication node 144 without accessing the central server 138. By transmitting a request for relative position reports, an appropriately configured transceiver 144 in a public safety vehicle can receive a relative location (e.g., bearing and distance) of a valve that is reporting an error condition (e.g., fire, elevated CO, etc.). This capability may be enhanced by positioning three communication reference nodes at various known locations along a city block to provide reference locations that can enable more accurate location of each reporting valve within three dimensions. Such self generated location reporting capabilities may aid fire and safety personnel to locate valves or nearby structures in the presence of smoke or sever structural damage (such as caused by earthquake, floods, or severe weather).

In a further embodiment, a home or building security system may be configured with a communication node that can send commands to an embodiment gas shutoff valve, with the security system configured to send a gas line shut off command via the wireless ad hoc communication network in the event of certain types of alarms, such as fire, high carbon monoxide levels, high gas levels, break in, etc.

Since the valve wireless communication and control electronics 10 are programmable, the functions of the various embodiments may be implemented by programming the control processor 102 with suitable processor-executable instructions. An example embodiment method 150 that may be implemented within the valve wireless communication and control electronics 10 is illustrated in FIGS. 15 and 16.

Figure 15:
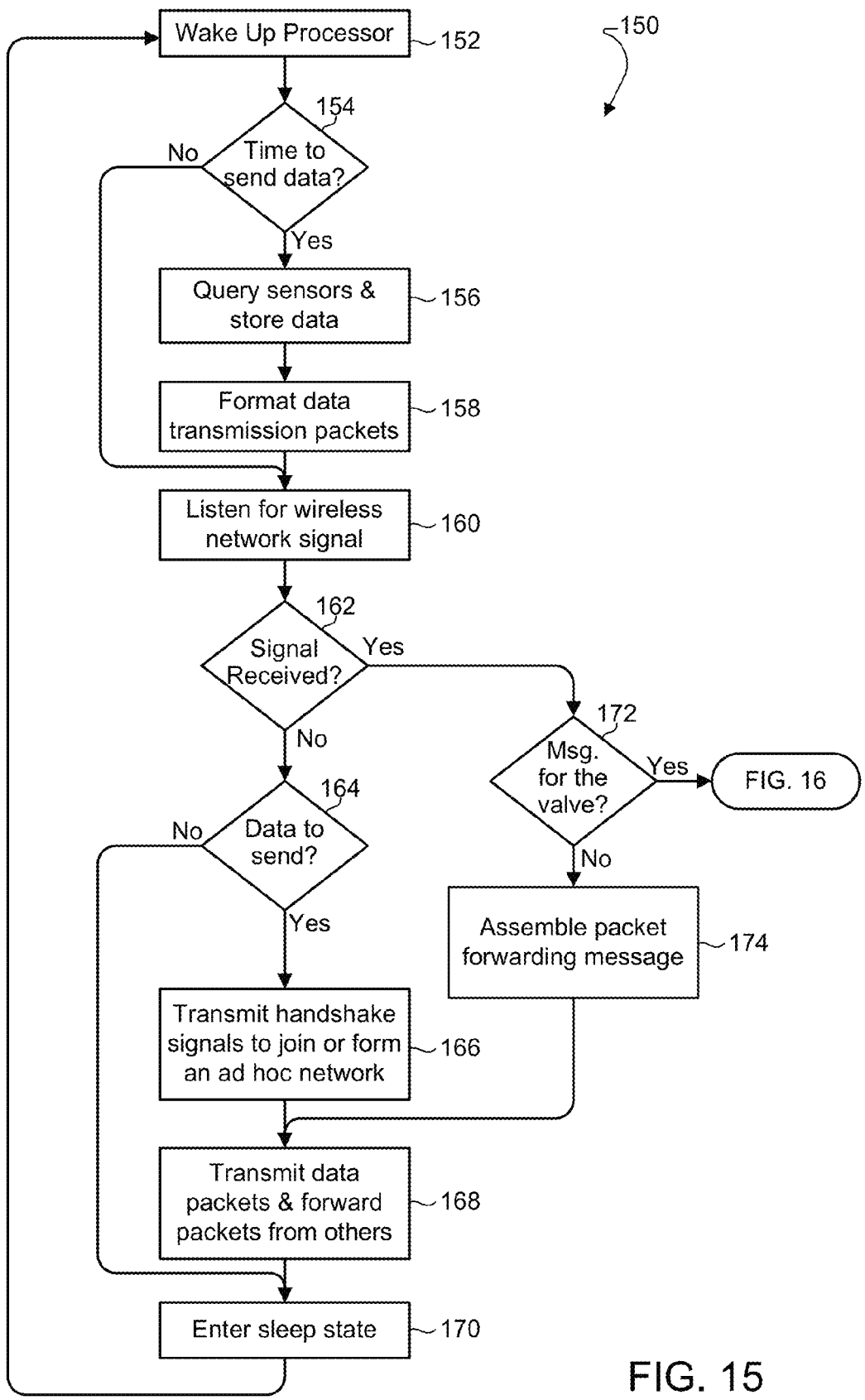
FIGS. 15 and 16 are process flow diagrams of a method that may be implemented within the control processor for controlling various operations of the gas shutoff valve according to an embodiment.

Referring to FIG. 15, the control processor 102 may be programmed to wake up from a power conserving sleep state in step 152. As mentioned above, control processor 102 may be configured to minimize the amount of time it is in a high power state. A low power timer circuit may be used to determine when the control processor 102 should wake up. For example, a timer or the control processor 102 may be configured to wake up every few seconds to detect whether there are any communications via an ad hoc wireless network that need to be received. Also, a variety of interrupts and state sensing circuits may be used to signal when the control processor 102 should wake up, such as to respond to a sensed condition.

In an embodiment of the wireless shutoff valve that includes a signal-power RFID transceiver 132 as described above with reference to FIGS. 10B and 10C, the operations in step 152 may include or involve the RFID transceiver receiving a wireless signal from an RFID reader (or other transmitter configured to transmit signals on the frequency received by the RFID transceiver), and in response signaling the control processor 102 to wake up, such as by toggling a line on an I²C bus 139.

In order to conserve power, the control processor 102 may be configured to quickly determine whether further actions are required, and if not, promptly return to a low power state. For example, in method 150, the processor may check a timer to determine whether it is time to gather and transmit sensor data in determination step 154. If the processor determines that it is time to transmit sensor data (i.e., determination step 154="Yes"), the processor may receive sensor inputs or send signals to sensors in order to query various connected sensors, and store any received sensor data in step 156. Examples of sensors that may be queried include temperature sensors (e.g., thermistors), pressure sensors, gas concentration sensors (e.g., CO and/or natural gas concentration), battery level measuring circuits, gas meter indicators, etc. The processor may then format the received data for transmission in suitably addressed message packets in step 158.

With data ready for transmission or if the processor determines that it is not time to transmit sensor data (i.e., determination step 154="No"), the processor may energize the radio transceiver 104 and monitor for wireless network signals in step 160. This step may involve merely monitoring radio frequency signals or logging into an established wireless ad hoc communication network. In determination step 162, the processor may determine whether a signal has been received via the radio transceiver. If the processor determines that no signal has been received (i.e., determination step 162="No"), the processor may determine whether there is data to send in determination step 164. If there is no data to send (i.e., determination step 164="No"), the processor may promptly returned to the sleep state in step 170.

If there is no established ad hoc communication network and the processor has data to transmit (i.e., determination step 164="Yes"), the processor may transmit the handshaking signals necessary to establish an ad hoc wireless communication network with nearby devices in step 166. Once a wireless ad hoc communication network is established, the processor may transmit the data packets via the network in step 168. Once all data packets have been transmitted, the processor may return to sleep state in step 170.

If upon monitoring for wireless network signals in step 160 the processor receives a signal (i.e., determination step 162="Yes"), the processor may determine how to respond to that signal by evaluating whether the received message is intended for the processor or for another addressee in determination step 172. If the received message is a message packets addressed to another node (e.g., the central server 138) or valve (i.e., determination step 172="No"), the processor may assemble the received message packets for forwarding in step 174, and transmit those packets via the established ad hoc network in step 168. In some circumstances, the processor may also need to transmit handshake signals to join or form such an ad hoc network in step 166. Once all of received packets have been relayed via the ad hoc communication network, the processor may return to the low power sleep state in step 170.

Figure 16:
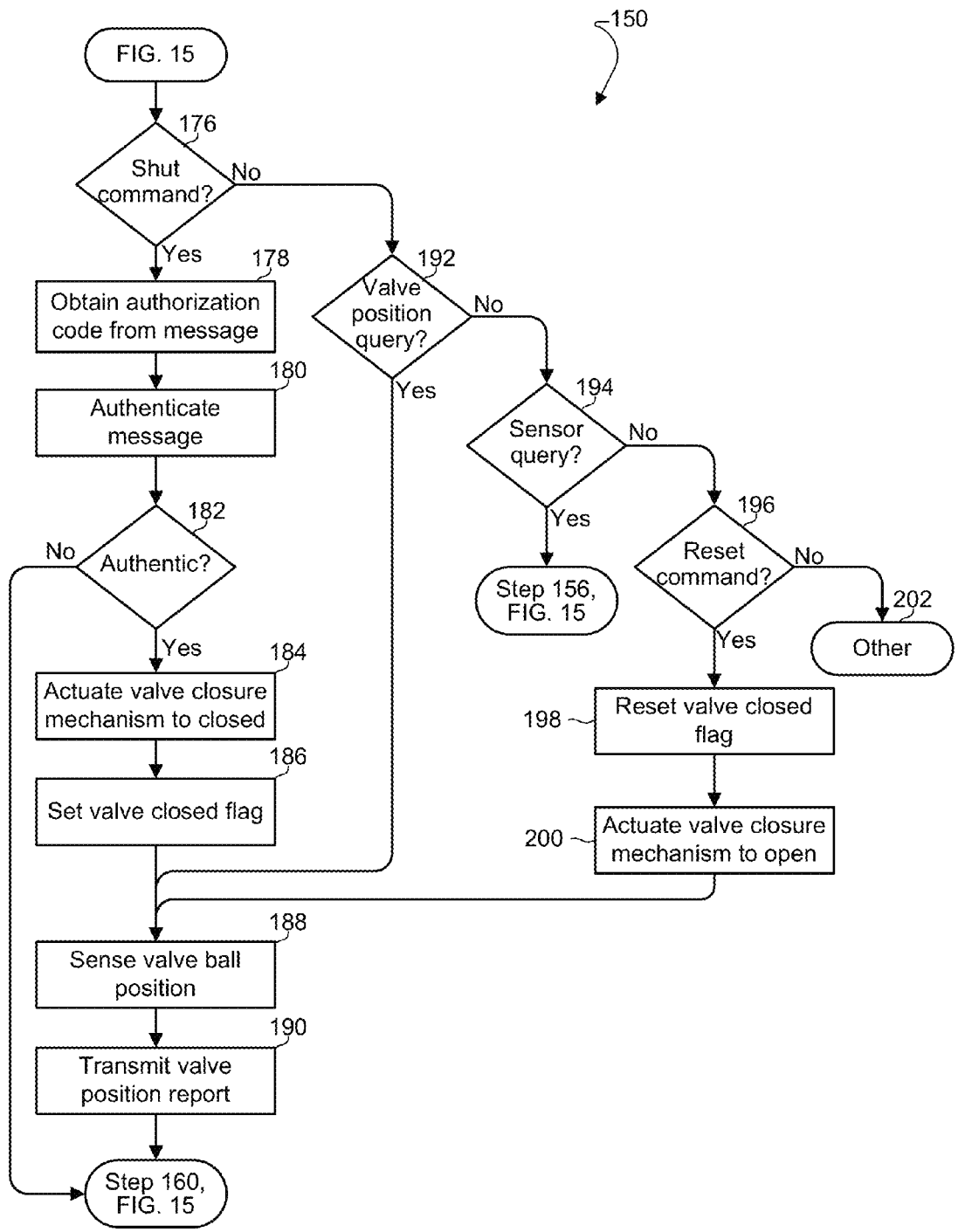
Figure 17:
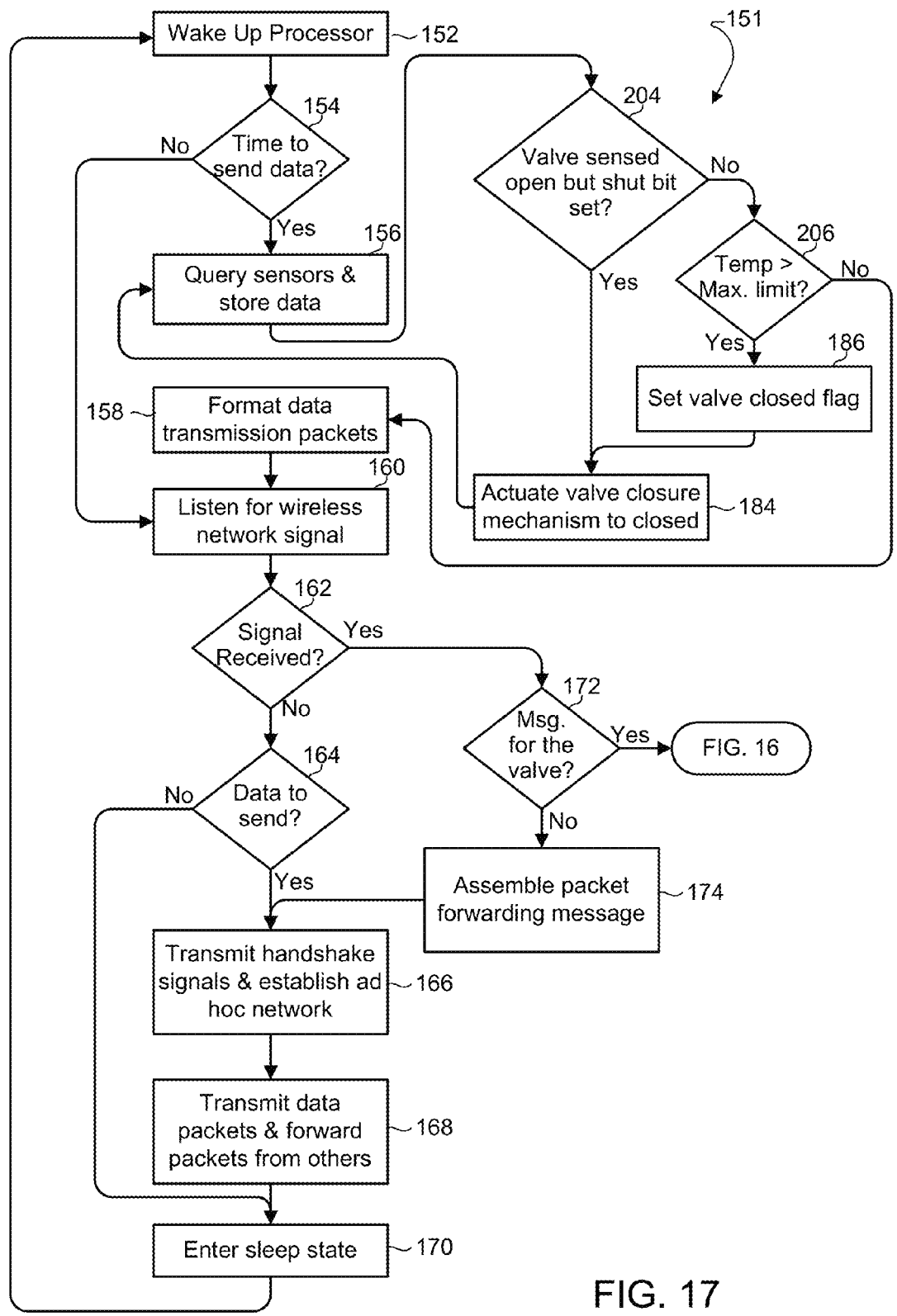
FIG. 17 is a process flow diagram of an alternative method that may be used within the control processor for controlling operations of the gas shutoff valve according to another embodiment.

If the processor determines the received signals are addressed to it in determination step 172, such as an address in the message matches the serial ID stored in memory, the processor may analyze the received message to determine the type of action that is required, such as by performing operations of method 150 that are illustrated in FIG. 16. For example, the processor may evaluate the received message to determine whether it is a command to shut the valve in determination step 176. If so (i.e., determination step 176="Yes"), the processor may obtain from the message the associated authorization code in step 178. Using the authorization code in the message, the processor may authenticate the message in step 180, such as by comparing the received authentication code to known authentication codes stored in memory (e.g., flash memory 106). Other known methods for authenticating methods may be performed by the processor as part of step 180.

If the processor determines that the shut command message is authentic in determination step 182, the processor may actuate the valve closure mechanism to move it to the close positioned in step 184. As part of the valve closing process, the processor may set a flag bit indicating that the valve should be in the closed configuration in step 186. Setting such a flag value in memory may enable the processor to later determine whether the valve has improperly returned to the open configuration. A valve shut bit may also be useful in reporting status of the valve, such as to a central server. The processor may also be configured to query a sensor to sense whether the valve ball is in the shut position or confirm that the valve ball is no longer in the open position in step 188. In step 190, the processor may transmit the determine the valve position in a reporting message to the device issuing the valve closure command via the wireless ad hoc communication network in step 190. With the valve shut operation completed, the processor may return to step 160 described above with reference to FIG. 15. Also, if the processor determines that the received shut command message was not authentic (i.e., determination step 182="No"), the processor may be configured to ignore such messages and return to step 160 described above with reference to FIG. 15.

If the processor determines that the received message is not a shut command (i.e., determination step 176="No"), the processor may determine whether the message is requesting valve status information, such as the current position of the valve in determination step 192. If the processor determines that the message is a valve position inquiry (i.e., determination step 192="Yes"), the processor may query sensors to sense the valve ball position in step 188 and report that information in step 190 to the device issuing a valve position inquiry message, before returning to step 160 in FIG. 15.

If the received message is not a valve position inquiry (i.e., determination step 192="No"), the processor may determine whether the received message is requesting current sensor data in determination step 194. If so, the processor may proceed to step 156 described above with reference to FIG. 15 even though it may not be time to report data according to predefined schedule.

If the received message is not a sensor query (i.e., determination step 194="No"), the processor may determine whether the received message provides a valve reset command in determination step 196. If so, the processor may reset the valve close flag bit in memory in step 198 and, if so configured, actuate the valve closure mechanism to the open configuration in step 200. As described above, this may involve energizing an actuator motor which moves an actuator gear causing an external magnet to move the valve ball from the close positioned to the open configuration. Once the valve open actuation is completed, the processor may confirm the valve open state by sensing the valve ball position in step 188. The processor may also transmit the valve position information in step 192 the device that issued the valve reset command, before returning to step 160 in FIG. 15.

If the received message is not a valve reset command (i.e., determination step 196="No"), the processor may perform whatever other command is indicated in message. A wide variety of other functions may be programmed into the control processor. For example, in an embodiment, a command may request the valve's relative location information, in which case the processor may estimate its location relative to other valves and communication nodes in the ad hoc wireless communication network based upon their respective signal strength, and report the position information (or relative signal strength) to the device requesting the position information.

While FIG. 16 illustrates a series of "if-then" determinations by which the processor may determine an action requested by the received message, such determinations may be determined directly by recognizing a particular command code within the message. For example, command codes may be in the form of a single byte of information which the processor can compare to a table of commands in a table lookup procedure in order to determine in one step the actions that should be taken. Other known message interpretation methods may also be used for determining the appropriate course of action that should be implemented in response to a received command message.

As mentioned above, some embodiments may include sensors that may be used to report internal and ambient conditions, such as temperature or various gas concentrations. Such functionality may be implemented by including appropriate sensor interpretation operations within the software instructions programmed into the processor, such as illustrated in method 151 illustrated in FIG. 17. In this example method, after the processor has been woken up in step 152 and obtained sensor data in step 156, the processor may interpret the stored data to determine if any automatic actions are required. For example, in determination step 204 the processor may compare the valve position as determined by sensors to the position it should be in. For example, if the processor determines from sensor values that the valve is in the open configuration but the valve shut flag bit is set indicating that the valve should be closed (i.e., determination step 204="Yes"), the processor may actuate the valve closure mechanism in step 184. As a further example, if the processor determines that the valve is open and the shut bit is not set (i.e., determination step 204="No"), the processor may compare the temperature measured by a temperature sensor to a maximum limit stored in memory to determine whether the maximum threshold is exceeded in determination step 206. If the maximum temperature is exceeded (i.e., determination step 206="Yes"), the processor may set the valve closed flag in step 186 and then actuate the valve closure mechanism in step 184. After performing the valve closure actuation in step 184, processor may re-perform the sensor query operation in step 156 to confirm that the valve is now in the closed configuration. With automatic responses completed, the processor may proceed with the operations described above with reference to FIGS. 15 and 16.

While the various embodiments have been disclosed as a standalone valve assembly, the embodiments may also be incorporated within or as part of a gas meter or other type of fluid measurement instrument. In such a configuration, the valve may be included as part of the gas flow path through the meter, and the wireless communication and control electronics 10 may be integrated with or included as part of the electronics used in the gas meter. In such embodiments, the wireless ad hoc communication network enabled by the wireless communication and control electronics 10 may be used to report meter readings to a central server 138. This embodiment would enable utilities to collect gas consumption readings through wireless networks without the need to establish dedicated communication networks.

In a further embodiment, the wireless fluid valve may be configured to communicate data to and receive data from other appliances and devices equipped with compatible wireless communication capabilities, such as ZigBee, WiFi and Bluetooth, referred to herein as "smart appliances." This embodiment may enable wireless fluid valves to share command or state information with smart appliances, for example, such as to enable coordinated actions in response to a detected hazardous condition. For example, a wireless gas shutoff valve according to this embodiment may be configured to communicate with wireless smart gas appliances to alter them to a low pressure or no gas (e.g., valve closed) condition so the appliance can take actions (such as shutting off power) to preclude a hazardous condition. As another example, a smart oven or stove equipped with high temperature sensors may communicate alert the wireless gas shutoff valve when high temperatures associated with a fire are detected, enabling the valve to activate and shut off the gas supply. As another example, such an embodiment wireless gas shutoff valve may receive an alert from a smart smoke alarm that a fire is detected and shut off the gas supply in response.

Power for the wireless communication and control electronics 10 of the various embodiments may be provided by any known power source. In a first embodiment, power may be provided by a convention battery 62. In a second embodiment, power may be provided by a solar cell positioned on a surface of the valve body 2 or electronics package 3. Such a solar cell may generate power from incandescent light shining on the valve, which may be used to trickle charge a rechargeable battery 62 in order to extend battery life. In a third embodiment, power may be provided by a fuel cell which will have a configuration similar to that of the battery 62 shown in FIG. 2. Such a fuel cell may convert a small flow of gas into hydrogen gas and $CO_2$ via a catalyst, and then react the hydrogen with oxygen from the atmosphere to generate electricity using known fuel cell configurations. The electricity from the fuel cell may power the valve electronics, and may also be used to trickle charge a rechargeable battery. In fourth embodiment, power from an external source, such as house current, other power-generating meters is used to power the valve electronics and/or trickle charge a rechargeable battery. In a fifth embodiment, power may be harvested from the kinetic energy in the flow of fluids though the fluid line or other nearby fluid supply lines by an energy harvesting mechanism, such as by means of a rotating turbine coupled to an electrical generator. Energy harvesting mechanisms suitable for use in various embodiments, particularly in applications where the fluid is a liquid (e.g., water) are disclosed in U.S. Pat. No. 7,605,485, which is hereby incorporated by reference in its entirety.

In a further embodiment, the wireless communication and control electronics 10 may include a tunable antenna that can be tuned to maximize its RF performance in the environment in which the valve is installed. Tunable antennas are well known, and include circuitry that enables a microprocessor to automatically optimize the impedance matching of an antenna. For example, if a fluid valve is placed in a position that de-tunes its antenna, for example next to a metal duct, the antenna will become de-tuned, or, in a state of impedance mismatch. This mismatch generally reduces the radio range of the fluid valve. A fluid valve equipped with a tunable antenna will automatically adjust the internal circuitry to minimize the impedance mismatch, maximizing the radio range of the fluid valve. This embodiment may include as part of the control operations an operation of automatically tuning the antenna as part of an initial configuration and/or registration process that is performed by an installer or authority (e.g., a utility) after the valve is installed.

In an embodiment method for automatically tuning the antenna, the microprocessor commands the radio module to transmit a single tone at the desired operational frequency. Embedded circuitry provides feedback to the processor, as a voltage measurement, that is proportional to the transmitted power. The higher the voltage, the greater power output. The highest power output will be achieved when the impedance of the transmitter matches that of the antenna. While monitoring the feedback voltage, the microprocessor will initiate an algorithm that is designed to engage selected capacitors and/or inductors in the transmission path to maximize the voltage or match the impedance. Once the feedback voltage is maximized, the transmitter (and hence the receiver) is optimally tuned to the antenna.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A fluid shutoff valve, comprising:
    a valve assembly comprising:
        a valve body having a fluid inlet, a fluid outlet and a valve interior, at least a portion of the valve body comprising a non-ferromagnetic material;
        a valve ball positioned within the valve interior, the valve ball comprising a ferromagnetic material; and
        a valve seat within the valve interior configured to receive the valve ball when the valve is in a shut configuration,
        wherein the valve body, valve ball and valve seat are configured to inhibit flow of fluid through the fluid outlet when the valve is in a shut configuration;
    a valve actuation mechanism comprising a magnet positioned outside the valve interior;
    a control processor electrically coupled to the valve actuation mechanism; and
    a first wireless transceiver coupled to the control processor and configured to receive wireless signals,
    wherein the control processor is configured with processor-executable instructions to send a valve closure signal to the valve actuation mechanism in response to the first wireless transceiver receiving a wireless signal, and
    wherein the valve actuation mechanism is configured to:
        apply a magnetic field from the magnet to the valve ball with sufficient force to hold the valve ball in an open configuration in which the valve ball is removed from the valve seat; and
        reduce the magnetic force applied to the valve ball sufficient to enable the valve ball to engage the valve seat in response to receiving the valve closure signal from the control processor.

2. The fluid shutoff valve of claim 1, wherein the first wireless transceiver is a radio frequency identity (RFID) transceiver configured to receive command signals from an RFID transmitter.

3. The fluid shutoff valve of claim 2, further comprising:
    an energy harvesting circuit coupled to an antenna, the RFID transceiver and the control processor, wherein the energy harvesting circuit is configured to harvest electrical energy from signals received from the RFID transmitter; and
    a memory coupled to the control processor,
    wherein the control processor is configured to receive electrical power from the energy harvesting circuit and configured with processor-executable instructions to perform operations comprising:
    receiving valve information via the RFID transceiver;
    store the received valve information in the memory;
    transmit wireless reply messages in response to received wireless signals; and
    include the valve information stored in the memory in transmitted wireless messages.

4. The fluid shutoff valve of claim 3, wherein the valve information stored in the memory comprises a customer account number and an address where the valve is installed, and wherein the control processor is further configured with processor-executable instructions to store data received from the one or more sensors in the memory until transmitted via the wireless transceiver in a wireless message that comprises the customer account number, the address where the valve is installed and the sensor data.

5. The fluid shutoff valve of claim 2, further comprising:
    a power supply; and
    a second wireless transceiver coupled to the control processor and to the power supply,
    wherein:
        the RFID transceiver comprises an I2C bus coupled to the control processor and is configured to receive a wakeup wireless signal from the wireless transmitter and draw sufficient power from the wakeup wireless signal to toggle a line to wake up the control processor;
        the control processor is configured to be in a dormant state drawing little power from the power supply until woken up by the RFID transceiver toggling the line on the I2C, and activate the second wireless transceiver in response to the RFID transceiver toggling the line on the I2C;
        the second wireless transceiver is configured to receive commands from a wireless network and pass the commands to the control processor; and
        the control processor is configured with processor-executable instructions to send a valve closure signal to the valve actuation mechanism in response to receiving a valve closure command from the second wireless transceiver.

6. The fluid shutoff valve of claim 5, wherein the control processor is assigned a unique Internet protocol version 6 (IPv6) address and the valve closure command received from the second wireless transceiver is addressed to the fluid shutoff valve using the assigned IPv6 address.

7. The fluid shutoff valve of claim 1, wherein:
the first wireless transceiver and the control processor are configured to establish an ad hoc wireless communication network according to one of the IEEE 802.15.4 standard ZigBee standard;
the control processor is assigned a unique Internet protocol version 6 (IPv6) address; and
the valve closure command message received via the first wireless transceiver is addressed to the fluid shutoff valve using the assigned IPv6 address and communicated over the ad hoc wireless communication network.

8. The fluid shutoff valve of claim 1, wherein:
the first wireless transceiver is a WiFi transceiver;
the control processor is assigned a unique Internet protocol version 6 (IPv6) address; and
the valve closure command message received via the first wireless transceiver is addressed to the fluid shutoff valve using the assigned IPv6 address and communicated over a WiFi communication network.

9. The fluid shutoff valve of claim 1, wherein:
the first wireless transceiver is a Bluetooth transceiver;
the control processor is assigned a unique Internet protocol version 6 (IPv6) address; and
the valve closure command message received via the first wireless transceiver is addressed to the fluid shutoff valve using the assigned IPv6 address and communicated over a Bluetooth communication link.

10. The fluid shutoff valve of claim 1, wherein the control processor is configured with processor-executable instructions to perform operations comprising:
receiving information via the first wireless transceiver from a smart appliance;
determining whether the information received from the smart appliance indicates a hazard condition; and
sending the valve closure signal to the valve actuation mechanism in response to determining that the information received from the smart appliance indicates a hazard condition.

11. The fluid shutoff valve of claim 1, wherein the control processor is configured with processor-executable instructions to perform operations comprising transmitting to a smart appliance a wireless message including a valve close or open status.

12. The fluid shutoff valve of claim 2, wherein the control processor is configured with processor-executable instructions to be reprogrammable via signals received via the RFID transceiver.

13. The fluid shutoff valve of claim 1, wherein the control processor is configured with processor-executable instructions to perform operations further comprising:
sensing an electromagnetic environment of the valve via an antenna coupled to the first wireless transceiver; and
automatically tuning the antenna coupled to the transceiver based on the sensed electromagnetic environment.

14. The fluid shutoff valve of claim 13, wherein the control processor is configured with processor-executable instructions to perform operations such that:
sensing an electromagnetic environment of the valve via an antenna coupled to the first wireless transceiver comprises transmit a single tone at a desired operational frequency and measuring a voltage that is proportional to the transmitted power; and
automatically tuning the antenna coupled to the first wireless transceiver based on the sensed electromagnetic environment comprises engaging one or more of capacitors and inductors in a transmission path of the first wireless transceiver to maximize the measured voltage.

* * * * *